US010728071B2

(12) United States Patent
Suzuki et al.

(10) Patent No.: US 10,728,071 B2
(45) Date of Patent: Jul. 28, 2020

(54) TERMINAL APPARATUS, BASE STATION APPARATUS, AND COMMUNICATION METHOD

(71) Applicants: SHARP KABUSHIKI KAISHA, Sakai, Osaka (JP); FG Innovation Company Limited, Tuen Mun (HK)

(72) Inventors: Shoichi Suzuki, Sakai (JP); Tatsushi Aiba, Sakai (JP); Kimihiko Imamura, Sakai (JP); Wataru Ohuchi, Sakai (JP); Takashi Hayashi, Sakai (JP); Tomoki Yoshimura, Sakai (JP); Liqing Liu, Sakai (JP)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 29 days.

(21) Appl. No.: 16/097,045

(22) PCT Filed: Apr. 19, 2017

(86) PCT No.: PCT/JP2017/015659
§ 371 (c)(1),
(2) Date: Oct. 26, 2018

(87) PCT Pub. No.: WO2017/188075
PCT Pub. Date: Nov. 2, 2017

(65) Prior Publication Data
US 2019/0158327 A1    May 23, 2019

(30) Foreign Application Priority Data

Apr. 28, 2016    (JP) .................................. 2016-090465

(51) Int. Cl.
*H04W 72/04* (2009.01)
*H04L 5/00* (2006.01)
(Continued)

(52) U.S. Cl.
CPC ........ *H04L 27/2607* (2013.01); *H04L 1/1812* (2013.01); *H04L 5/0055* (2013.01);
(Continued)

(58) Field of Classification Search
CPC ............................. H04W 72/12; H04W 72/14
See application file for complete search history.

(56) References Cited

U.S. PATENT DOCUMENTS

2015/0208402 A1    7/2015   Hwang et al.
2019/0280842 A1*   9/2019   Suzuki .................. H04L 5/0083

OTHER PUBLICATIONS

Ericsson. "Physical layer aspects for PUSCH for short TTI", 3GPP TSG RAN WG1 Meeting #84 bis, R1-163320, Busan, Apr. 11-15, 2016.
(Continued)

*Primary Examiner* — Angel T Brockman
(74) *Attorney, Agent, or Firm* — ScienBiziP, P.C.

(57) ABSTRACT

Uplink control information can be efficiently transmitted. A terminal apparatus (1) receives an uplink grant used for scheduling of a PUSCH in a serving cell and an uplink grant used for scheduling of a sPUSCH in the serving cell, transmits a periodic channel state information report by using the PUCCH in the serving cell, and in a case that transmission of the sPUSCH occurs in a subframe in which transmission of the periodic channel state information report by using the PUCCH has already started, stops the transmission of the PUCCH already started. According to the present invention, the terminal apparatus (1) can efficiently transmit the uplink control information. The base station apparatus (3) can efficiently receive the uplink control information.

6 Claims, 16 Drawing Sheets

(51) Int. Cl.
   *H04L 27/26*   (2006.01)
   *H04W 72/14*   (2009.01)
   *H04W 72/12*   (2009.01)
   *H04L 1/18*    (2006.01)

(52) U.S. Cl.
   CPC .......... *H04W 72/04* (2013.01); *H04W 72/12* (2013.01); *H04W 72/14* (2013.01); *H04W 72/0413* (2013.01)

(56) References Cited

OTHER PUBLICATIONS

Ericsson, Huawei. "New SI proposal: Study on Latency reduction techniques for LTE", 3GPP TSG RAN Meeting #67, RP-150465, Shanghai, China, Mar. 9-12, 2015.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.2.0 (Dec. 2015).

"3rd Generation Partnership Project; Technical Specification Group Radio Access Network; Evolved Universal Terrestrial Radio Access (E-UTRA); Physical layer procedures (Release 13)", 3GPP TS 36.213 V13.1.1 (Mar. 2016).

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0 (Mar. 2016).

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0 (Mar. 2016).

* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied. In LTE, a base station apparatus is also referred to as an evolved NodeB (eNodeB), and a terminal apparatus is also referred to as a User Equipment (UE). LTE is a cellular communication system in which multiple areas each covered by the base station apparatus are deployed to form a cellular structure. A single base station apparatus may manage multiple cells.

It is specified in LTE release 13 that uplink control information is transmitted on a PUSCH and a PUCCH (NPLs 1, 2, 3, and 4). It is discussed in NPL 5 shortening a Transmission Time Interval (TTI) and reduction in processing time. It is discussed in NPL 6 that channel state information and Hybrid Automatic Repeat reQuest-ACKnowledgement (HARQ-ACK) are transmitted on a sPUCCH and a sPUSCH.

CITATION LIST

Non Patent Literature

NPL 1: "3GPP TS 36.211 V13.1.0 (2016 March)", 29 Mar. 2016.
NPL 2: "3GPP TS 36,212 V13.1.0 (2016 March)", 29 Mar. 2016.
NPL 3: "3GPP TS 36.213 V13.1.1 (2016 March)", 31 Mar. 2016.
NPL 4: "3GPP TS 36.300 V13.2.0 (2015 December)", 13 Jan. 2015.
NPL 5: "New SI proposal: Study on Latency reduction techniques for UTE", RP-150465, Ericsson, Huawei, 3GPP TSG RAN Meeting #67, Shanghai, China, 9-12 Mar. 2015.
NPL 6: "Physical layer aspects for PUSCH for short TTI", R1-163320, Ericsson, 3GPP TSG RAN WG1 Meeting #84 bis, Busan, 11-15 Apr. 2016.

SUMMARY OF INVENTION

Technical Problem

The present invention provides a terminal apparatus capable of efficiently transmitting uplink control information, a communication method used for the terminal apparatus, an integrated circuit mounted on the terminal apparatus, a base station apparatus capable of efficiently receiving uplink control information, a communication method used for the base station apparatus, and an integrated circuit mounted on the base station apparatus.

Solution to Problem (1) According to some aspects of the present invention, the following measures are provided. Specifically, a first aspect of the present invention is a terminal apparatus for communicating with a base station apparatus by using at least one serving cell, the terminal apparatus including: a reception unit configured to receive an uplink grant used for scheduling of a sPUSCH in the serving cell; and a transmission unit configured to transmit a periodic channel state information report by using a MATH in the serving cell, wherein in a case that transmission of the sPUSCH occurs in a subframe in which transmission of the periodic channel state information report by using the PUCCH has already started, the transmission unit further stops the transmission of the PUCCH already started.

(2) A second aspect of the present invention is a base station apparatus for communicating with a base station apparatus by using at least one serving cell, the base station apparatus including: a transmission unit configured to transmit an uplink grant used for scheduling of a sPUSCH in the serving cell; and a reception unit configured to receive a periodic channel state information report by using a PUCCH in the serving cell, wherein in a case that reception of the sPUSCH occurs in a subframe in which reception of the periodic channel state information report by using the PUCCH has already started, the reception unit further stops the reception of the PUCCH already started.

(3) A third aspect of the present invention is a communication method used by a terminal apparatus for communicating with a base station apparatus by using at least one serving cell, the communication method including: receiving an uplink grant used for scheduling of a sPUSCH in the serving cell; transmitting a periodic channel state information report by using a PUCCH in the serving cell; and in a case that transmission of the sPUSCH occurs in a subframe in which transmission of the periodic channel state information report by using the PUCCH has already started, stopping the transmission of the PUCCH already started.

(4) A fourth aspect of the present invention is a communication method used by a base station apparatus for communicating with a base station apparatus by using at least one serving cell, the communication method including: transmitting an uplink grant used for scheduling of a sPUSCH in the serving cell; receiving a periodic channel state information report by using a PUCCH in the serving cell; and in a case that reception of the sPUSCH occurs in a subframe in which reception of the periodic channel state information report by using the PUCCH has already started, stopping the reception of PUCCH already started.

Advantageous Effects of Invention

According to the present invention, a terminal apparatus can efficiently transmit uplink control information. In addition, a base station apparatus can efficiently receive the uplink control information.

DESCRIPTION OF EMBODIMENTS

Embodiments of the present invention will be described below.

Figure 1:
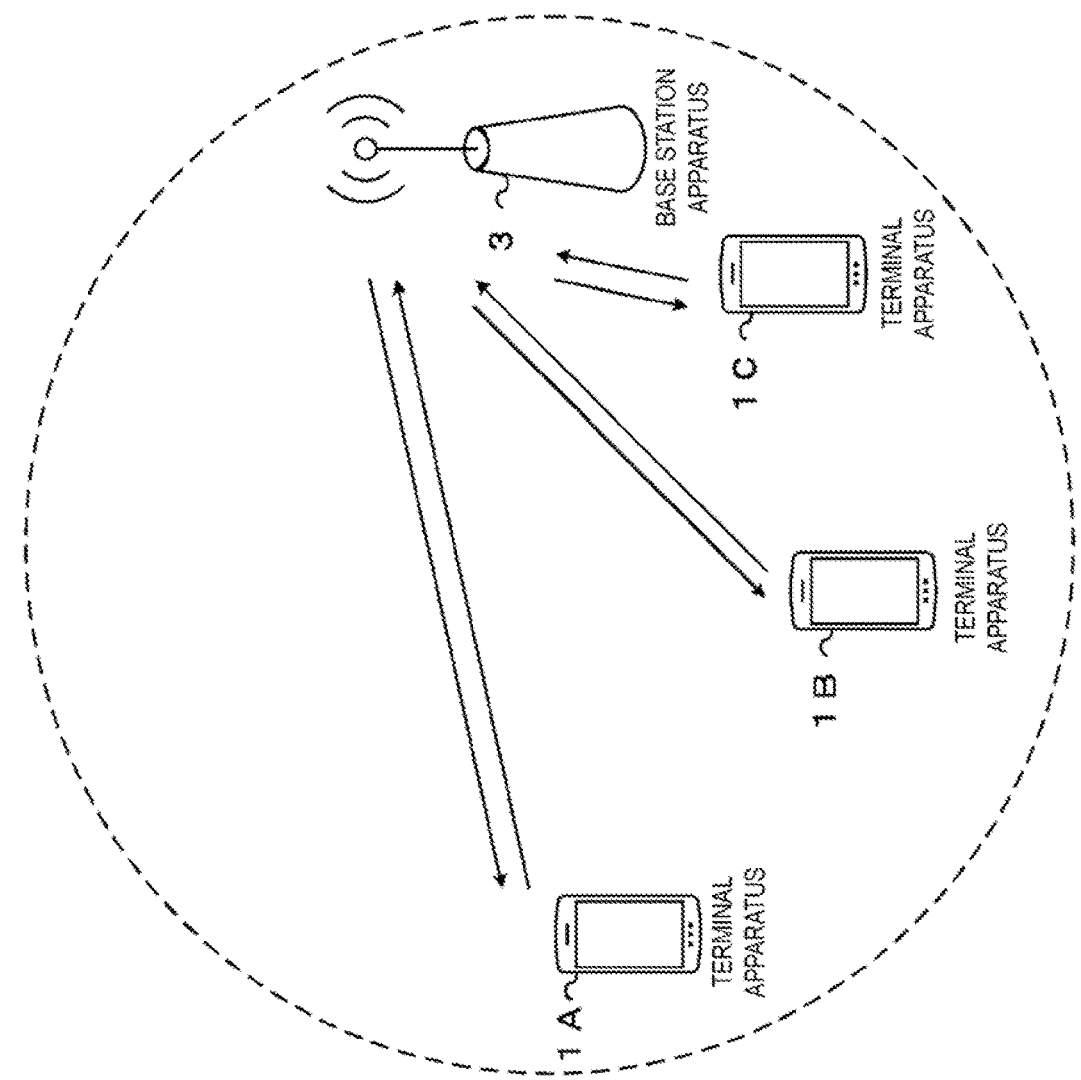
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Each of the terminal apparatuses 1A to 1C is referred to as a terminal apparatus 1 below.

Now, carrier aggregation will be described.

In the present embodiment, multiple serving cells are configured for the terminal apparatus 1. A technology in which the terminal apparatus 1 communicates via the multiple serving cells is referred to as cell aggregation or carrier aggregation. The present invention may be applied to each of the multiple serving cells configured for the terminal apparatus 1. Furthermore, the present invention may be applied to some of the configured multiple serving cells. Furthermore, the present invention may be applied to each of groups of the configured multiple serving cells. Furthermore, the present invention may be applied to some of the groups of the configured multiple serving cells.

The multiple serving cells include at least one primary cell. The multiple serving cells may include one or multiple secondary cells. The primary cell is a serving cell in which an initial connection establishment procedure has been performed, a serving cell in which a connection re-establishment procedure has been started, or a cell indicated as a primary cell during a handover procedure. At the point in time when a Radio Resource Control (RRC) connection is established, or later, a secondary cell(s) may be configured.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component careers). A single physical channel is transmitted in a single serving cell (component carrier) of the multiple serving cells (component carriers).

Physical channels and physical signals according to the present embodiment will be described.

In FIG. 1, the following uplink physical channels are used for uplink radio communication from the terminal apparatus 1 to the base station apparatus 3. The uplink physical channels are used for transmission of information output from higher layers.

Physical Uplink Control Channel (PUCCH)
shortened Physical Uplink Control Channel (sPUCCH)
Physical Uplink Shared Channel (PUSCH)
shortened Physical Uplink Shared Channel (sPUSCH)

The PUCCH and the sPUCCH are used for transmission of Uplink Control Information (UCI). In the present embodiment, the terminal apparatus 1 may perform PUCCH transmission only in the primary cell. The uplink control information includes: downlink Channel State Information (CSI); a Scheduling Request (SR) indicating a request for a PUSCH resource; and a Hybrid Automatic Repeat request ACKnowledgement (HARQ-ACK) for downlink data (Transport block, Medium Access Control Protocol Data Unit (MAC PDU), Downlink-Shared Channel (DL-SCH), or Physical Downlink Shared Channel (PDSCH)). The HARQ-ACK indicates an acknowledgement (ACK) or a negative-acknowledgement (NACK). The HARQ-ACK is also referred to as ACK/NACK, HARQ feedback, HARQ-ACK feedback, HARQ response, HARQ-ACK response, HARQ information, HARQ-ACK information, HARQ control information, or HARQ-ACK control information.

The PUSCH and the sPUSCH may be used to transmit uplink data (Transport block, Medium Access Control Protocol Data Unit: MAC PDU, Uplink-Shared Channel: UL-SCH). The PUSCH may be used to transmit the HARQ-ACK and/or channel state information along with the uplink data. Furthermore, the PUSCH may be used to transmit only the channel state information or to transmit only the HARQ-ACK and the channel state information.

An aperiodic channel state information report is triggered by a field contained in an uplink grant corresponding to the PUSCH/sPUSCH transmission. A periodic channel state information report is triggered by RRC signalling (higher layer parameter). The PUSCH is used for the aperiodic channel state information report. The PUSCH or PUCCH is used for the periodic channel state information report.

In FIG. 1, the following downlink physical channels are used for downlink radio communication from the base station apparatus 3 to the terminal apparatus 1. The downlink physical channels are used for transmission of information output from higher layers.

Physical Downlink Control Channel (PDCCH)
Enhanced Physical Downlink Control Channel (EPDCCH)
shortened Physical Downlink Control Channel (sPDCCH)
Physical Downlink Shared Channel (PDSCH)
shortened Physical Downlink Shared Channel (sPDSCH)

The PDCCH, the EPDCCH, and the sPDCCH are used for transmitting of Downlink Control Information (DCI). The downlink control information is also referred to as a DCI format. The downlink control information includes a downlink grant and an uplink grant. The downlink grant is also referred to as downlink assignment or downlink allocation.

One downlink grant is used for scheduling of one PDSCH within one cell. The downlink grant is used for scheduling of the PDSCH within a subframe the same as a subframe in which the downlink grant is transmitted. One downlink grant is used for scheduling of one sPDSCH within one cell. The downlink grant may be used for scheduling of a sPDSCH within a shortened Transmission Time Interval (sTTI) the same as a sTTI in which the downlink grant is transmitted.

One uplink grant may be used for scheduling of one PUSCH within one cell. The uplink grant may be used for scheduling of one PUSCH within the fourth or later subframe from the subframe in which the uplink grant is transmitted. One uplink grant may be used for scheduling of one sPUSCH within one cell. The uplink grant is used for scheduling of one sPUSCH in a sTTI later from the sTTI in which the uplink grant is transmitted.

The PDSCH and the sPDSCH are used for transmission of downlink data (Downlink Shared Channel (DL-SCH)).

The UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat re Quest (HARQ) is controlled for each transport block in the MAC layer. The transport block is a unit of data that the MAC layer delivers to the physical layer. In the physical layer, the transport block is mapped to a codeword and subjected to modulation processing and coding processing on a codeword-by-codeword basis. One codeword is mapped to one or multiple layers.

Figure 2:
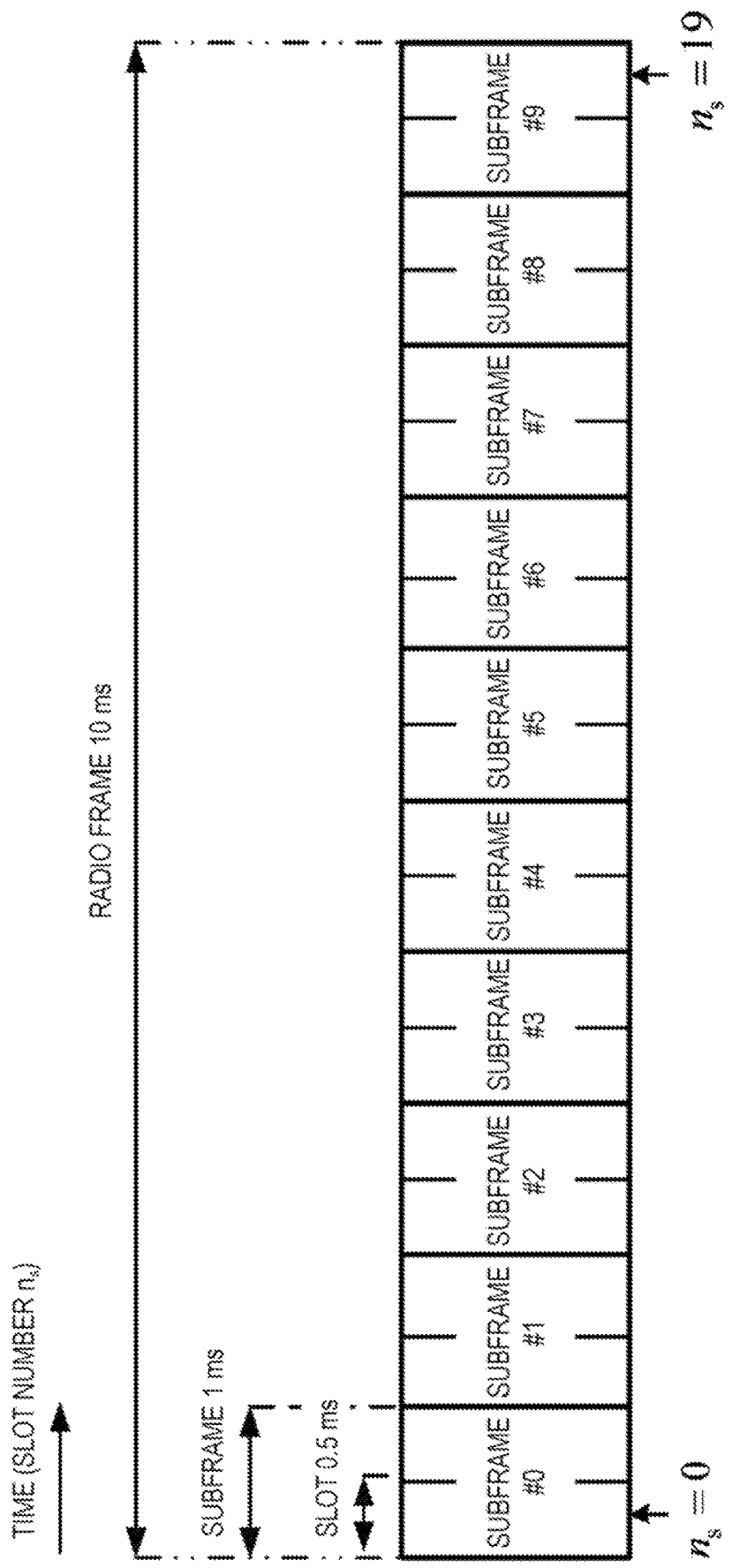
FIG. 2 is a diagram illustrating a schematic configuration of a radio frame according to the present embodiment.

An example of a configuration of the radio frame according to the present embodiment will be described below. FIG. 2 is a diagram illustrating a schematic configuration of a radio frame according to the present embodiment. Each of the radio frames is 10 ms in length. In FIG. 2, the horizontal axis is a time axis. Each of the radio frames is constituted of 10 subframes. Each of the subframes is 1 ms in length and is defined by two consecutive slots. Each of the slots is 0.5 ms in length. To be more precise, 10 subframes can be used at each interval of 10 ms. A subframe is also referred to as a Transmission Time Interval (TTI).

Figure 3:
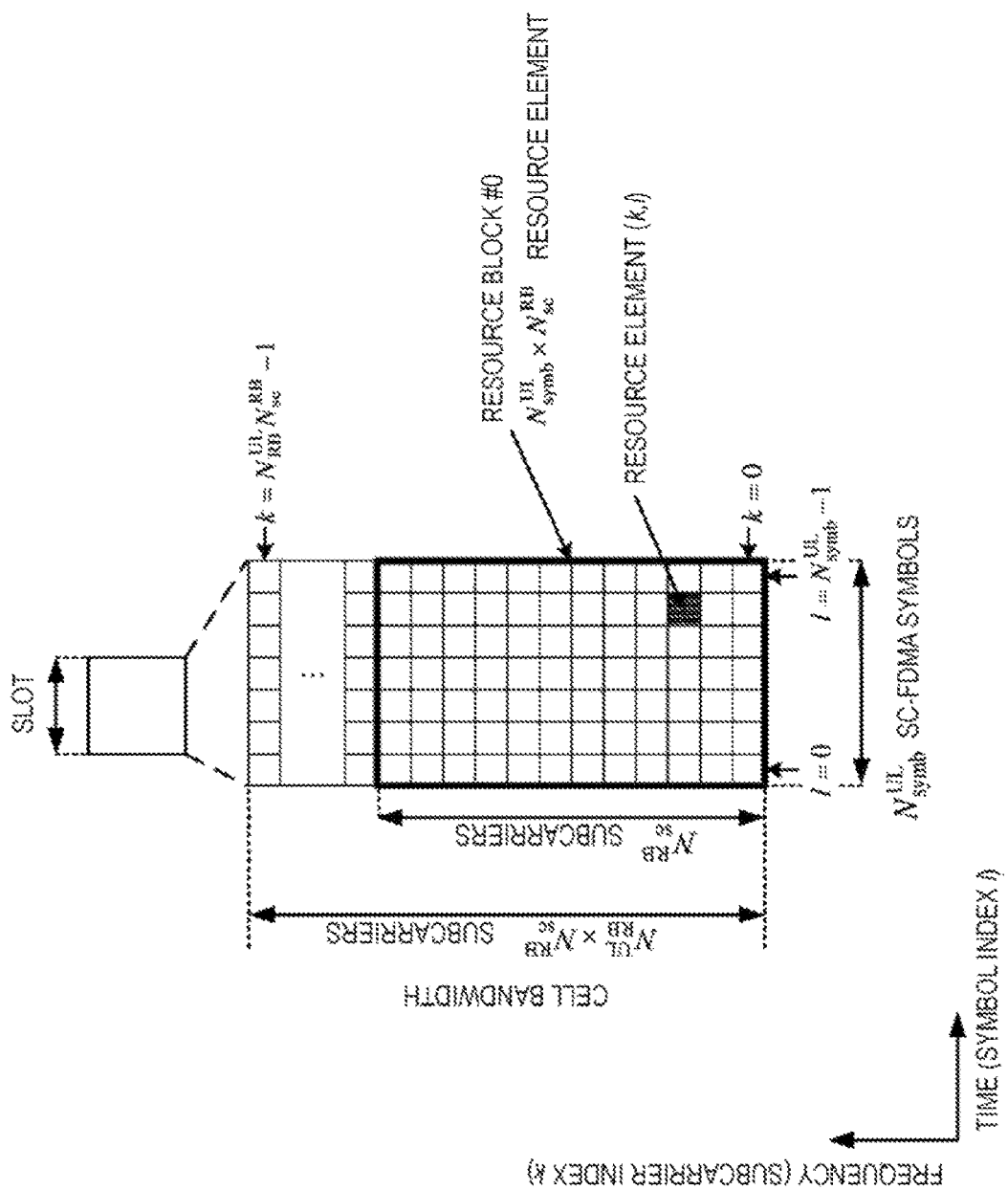
FIG. 3 is a diagram illustrating a schematic configuration of an uplink slot according to the present embodiment.

An example of a configuration of a slot according to the present embodiment will be described below. FIG. 3 is a diagram illustrating a schematic configuration of an uplink slot according to the present embodiment. FIG. 3 illustrates a configuration of an uplink slot in one cell. In FIG. 3, the horizontal axis is a time axis, and the vertical axis is a frequency axis. In FIG. 3, l is an SC-FDMA symbol number/index and k is a subcarrier number/index.

The physical signal or the physical channel transmitted in each of the slots is expressed by a resource grid. In the uplink, the resource grid is defined by multiple subcarriers and multiple SC-FDMA symbols. Each element within the resource grid is referred to as a resource element. The resource element is expressed by the subcarrier number/index k and the SC-TDMA symbol number/index l.

The uplink slot includes multiple SC-TDMA symbols 1 (l=0, 1, ..., and $N^{UL}_{symb}$) in a time domain. $N^{UL}_{symb}$ indicates the number of SC-FDMA symbols included in one uplink slot. For a normal Cyclic Prefix (CP) in the uplink, $N^{UL}_{symb}$ is 7. For an extended CP in the uplink, $N^{UL}_{symb}$ is 6.

The terminal apparatus 1 receives a parameter UL-CyclicPrefixLength indicating a CP length in the uplink from the base station apparatus 3. The base station apparatus 3 may broadcast, in a cell, system information including the parameter UL-CyclicPrefixLength corresponding to the cell.

The uplink slot includes multiple subcarriers k (k=0, 1, ..., $N^{UL}_{RB} \times N^{RB}_{sc}$) in a frequency domain. $N^{UL}_{RB}$ is an uplink bandwidth configuration for a serving cell, which is expressed by a multiple of $N^{RB}_{sc}$. $N^{RB}_{sc}$ is a (physical) resource block size in the frequency domain, which is expressed by the number of subcarriers. A subcarrier spacing Δf is 15 kHz, and $N^{RB}_{sc}$ may be 12. That is, $N^{RB}_{sc}$ may be 180 kHz. The subcarrier spacing Δf may be different for each channel and/or for each TTI/sTTI.

The resource block is used to express mapping of a physical channel to resource elements. For the resource block, a virtual resource block and a physical resource block are defined. The physical channel is first mapped to the virtual resource block. Thereafter, the virtual resource block is mapped to the physical resource block. One physical resource block is defined by $N^{UL}_{symb}$ contiguous SC-FDMA symbols in the time domain and by $N^{RB}_{sc}$ contiguous subcarriers in the frequency domain. Hence, one physical resource block is constituted by ($N_{ULsymb} \times N^{RB}_{sc}$) resource elements. One physical resource block corresponds to one slot in the time domain. The physical resource blocks are numbered (0, 1, ..., $N^{UL}_{RB}-1$) in an order starting from a lower frequency in the frequency domain.

A downlink slot in the present embodiment includes multiple OFDM symbols. A configuration of the downlink slot in the present embodiment is basically the same except that the resource grid is defined by multiple subcarriers and multiple OFDM symbols, and therefore, a description of the configuration of the downlink slot is omitted.

Figure 4:
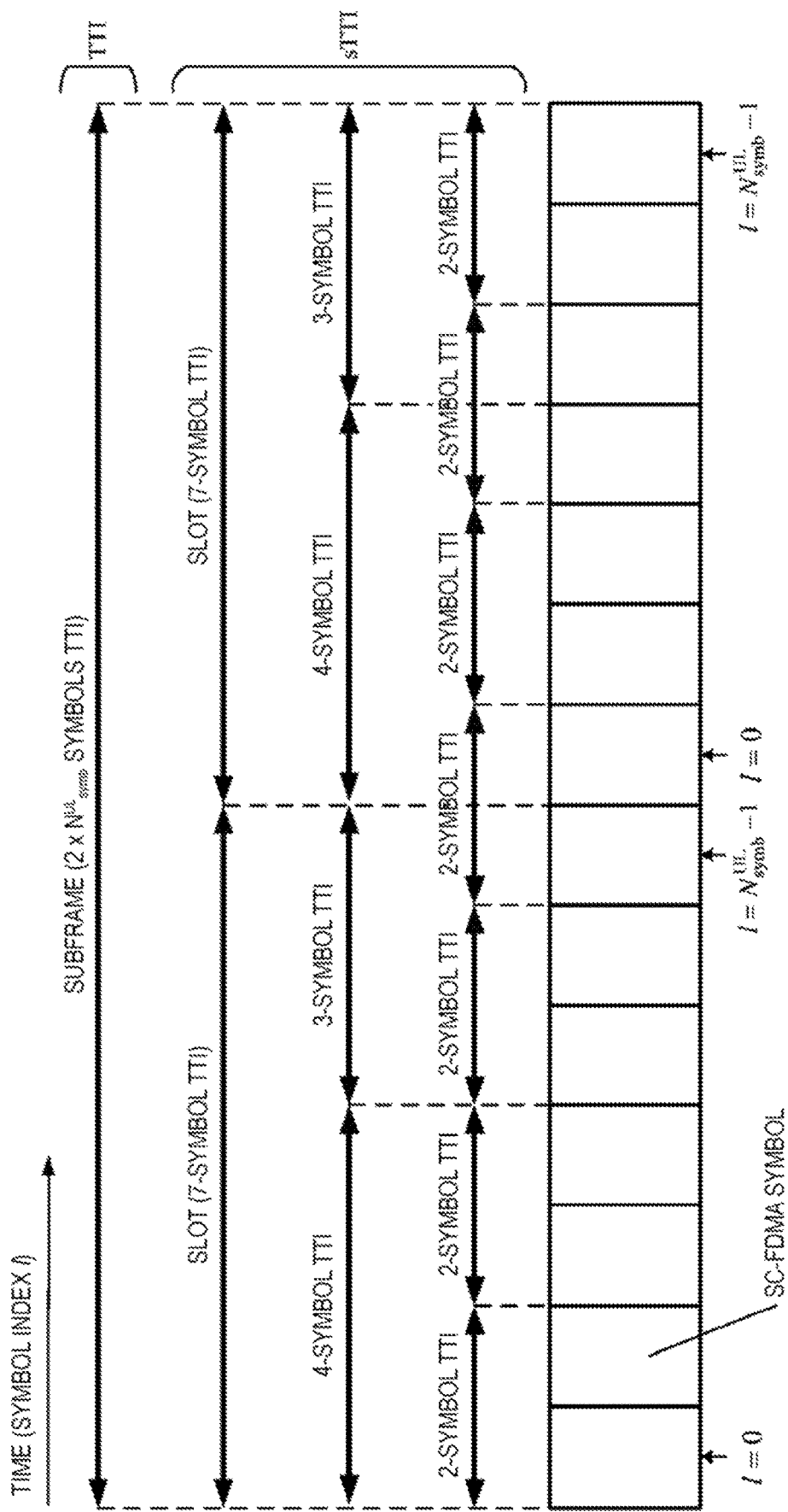
FIG. 4 is a diagram illustrating an example of a TTI and a sTTI according to the present embodiment.

FIG. 4 is a diagram illustrating an example of the TTI and the sTTI according to the present embodiment. The TTI may be constituted of $2 \times N^{UL}_{symb}$ SC-FDMA symbols. The number pf SC-FDMA symbols constituting the sTTI is any of {2, 3, 4, 7}. The TTI/sTTI constituted of X SC-FDMA symbols is also referred to as the X-symbol TTI. In the downlink, the TTI and the sTTI may be constituted of multiple OFDM symbols.

Figure 5:
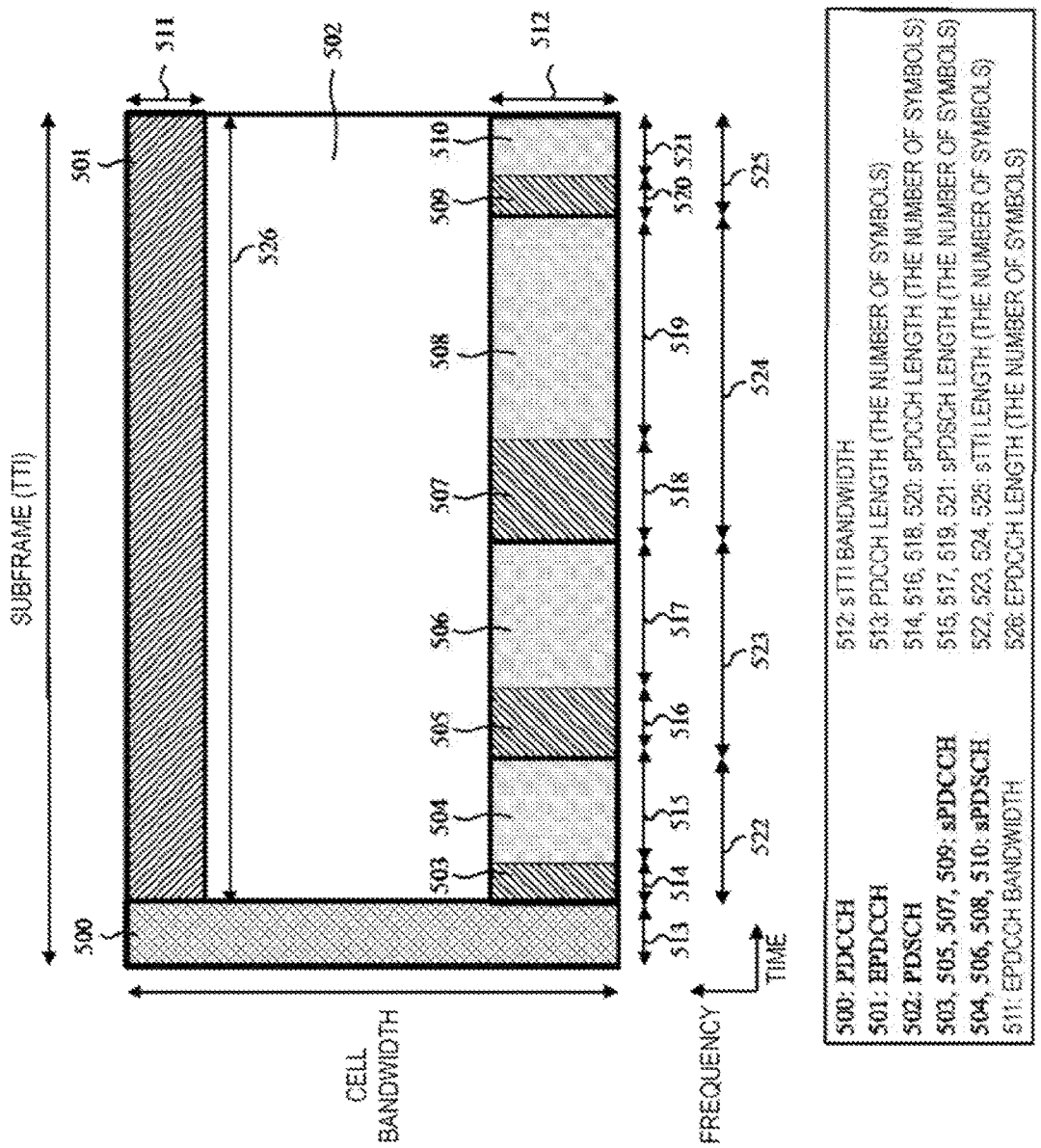
FIG. 5 is a diagram illustrating an example of physical channel allocation in a downlink according to the present embodiment.

FIG. 5 is a diagram illustrating an example of physical channel cation in the downlink according to the present embodiment.

A length of the sPUCCH and a length of the sPUSCH may be individually controlled. The length of the sPUCCH may be determined based on information transmitted on the sPUCCH. The length of the sPUCSH may be determined based on information transmitted on the sPUSCH.

Figure 6:
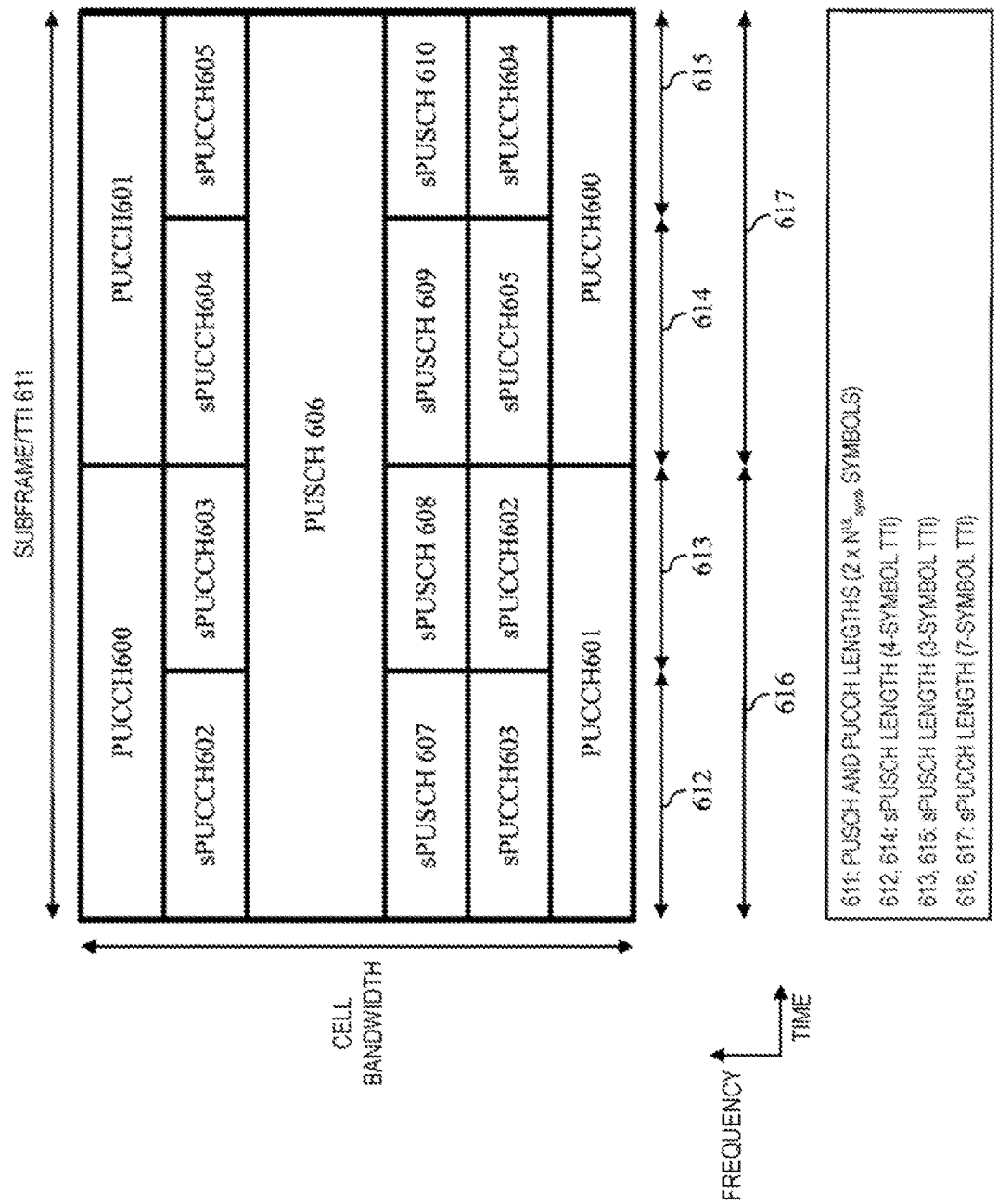
FIG. 6 is a diagram illustrating an example of physical channel allocation in an uplink according to the present embodiment.

FIG. 6 is a diagram illustrating an example of physical channel allocation in the uplink according to the present embodiment. Frequency hopping is applied to PUCCHs 600 and 601, and sPUCCHs 602 to 605. The PUSCH and the PUCCH may be mapped to $2 \times N^{UL}_{symb}$ SC-FDMA symbols in a subframe/TTI. In the 4-symbol TTI, the sPUSCH may be mapped to four SC-TDMA symbols. In the 3-symbol TTI, the sPUSCH may be mapped to three SC-FDMA symbol. In the 7-symbol TTI, the sPUCCH may be mapped to seven SC-TDMA symbols. The sPUSCH mapped to X SC-FDMA symbols in the X-symbol TTI is also referred to as the X-symbol sPUSCH. The sPUCCH mapped to X SC-FDMA symbols in the X-symbol TTI is also referred to as the X-symbol sPUCCH.

Hereinafter, an apparatus configuration of the terminal apparatus 1 according to the present invention will be described below.

Figure 7:
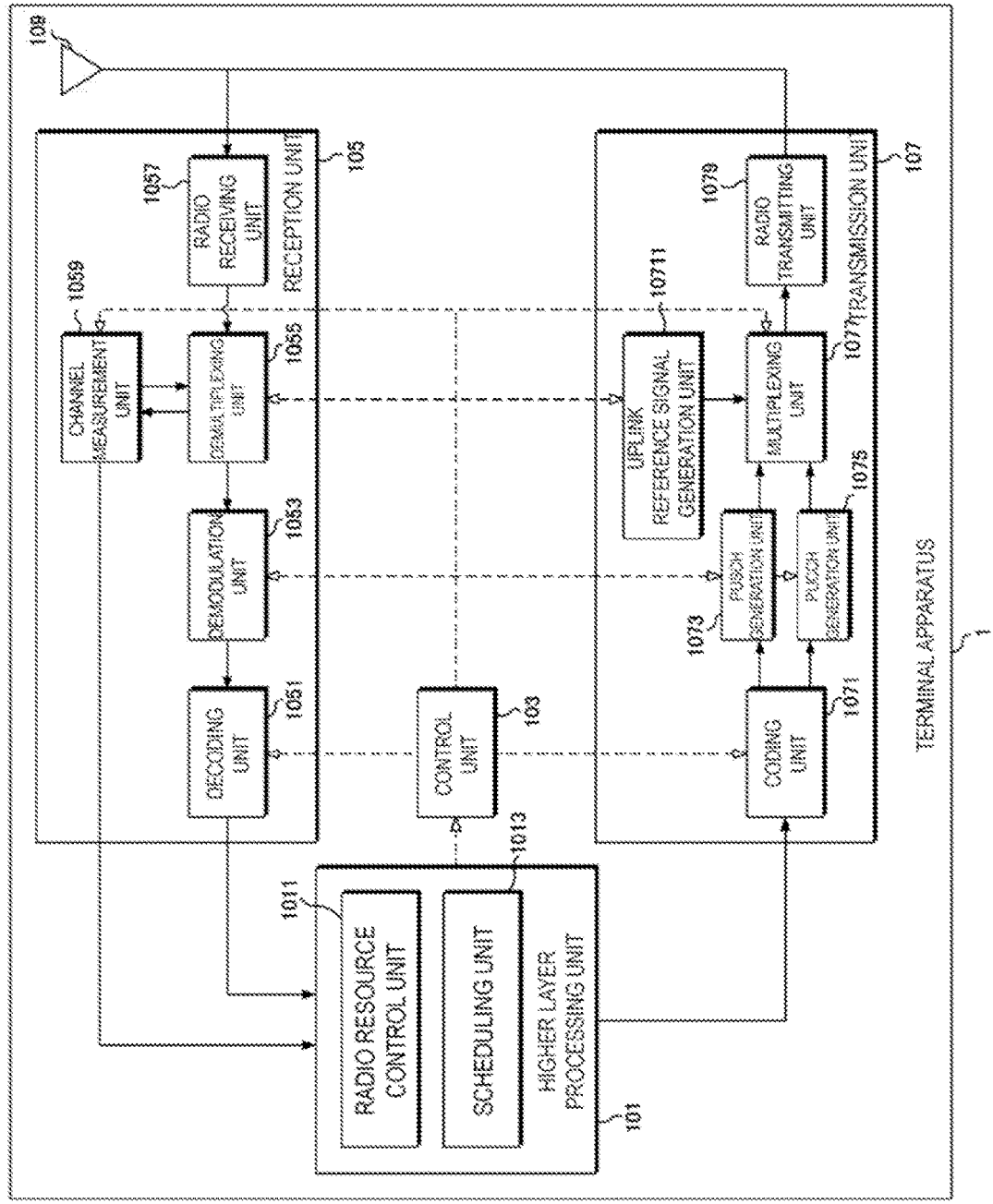
FIG. 7 is a schematic block diagram illustrating a configuration of a terminal apparatus 1 according to the present invention.

FIG. 7 is a schematic block diagram illustrating the configuration of the terminal apparatus 1 according to the present invention. As illustrated FIG. 7, the terminal apparatus 1 is configured to include a higher layer processing unit 101, a control unit 103, a reception unit 105, a transmission unit 107, and a transmit and receive antenna 109. The higher layer processing unit 101 is configured to include a radio resource control unit 1011 and a scheduling unit 1013. The reception unit 105 is configured to include a decoding unit 1051, a demodulation unit 1053, a demultiplexing unit 1055, a radio receiving unit 1057, and a channel measurement unit 1059. The transmission unit 107 is configured to include a coding unit 1071, a PUSCH generation unit 1073, a PUCCH generation unit 1075, a multiplexing unit 1077, and a radio transmitting unit 1079, and an uplink reference signal generation unit 10711.

The higher layer processing unit 101 outputs the uplink data generated by a user operation or the like, to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates control information for control of the reception unit 105 and the transmission unit 107, based on the downlink control information received on the PUCCH, and outputs the generated control information to the control unit 103.

The radio resource control unit 1011 included in the higher layer processing unit 101 manages various pieces of configuration information of the terminal apparatus 1 itself. For example, the radio resource control unit 1011 manages the configured serving cells. Furthermore, the radio resource control unit 1011 generates information to be mapped to each uplink channel, and outputs the generated information to the transmission unit 107. The radio resource control unit 1011, in a case of succeeding in decoding the received downlink data, generates an ACK to output the ACK to the transmission unit 107, and in a case of failing in decoding the received downlink data, generates a NACK to output the NACK to transmission unit 107.

The scheduling unit 1013 included in the higher layer processing unit 101 stores therein the downlink control information received via the reception unit 105. The scheduling unit 1013 controls the transmission unit 107 via the control unit 103 to transmit the PUSCH in the fourth subframe from the subframe in which the uplink grant is received, in accordance with the received uplink grant. The scheduling unit 1013 controls the reception unit 105 via the control unit 103 to receive the PDSCH in the subframe in which the downlink grant is received, in accordance with the received downlink grant.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station apparatus 3 through the transmit and receive antenna 109, and outputs the resulting information to the higher layer processing unit 101.

The radio receiving unit 1057 orthogonally demodulates the downlink signal received through the transmit and receive antenna 109 and converts the orthogonally demodulated analog signal to a digital signal. The radio receiving unit 1057 performs Fast Fourier Transform (ITT) on the digital signal and extracts a signal in the frequency domain.

The demultiplexing unit 1055 demultiplexes the extracted signal into the PDCCH, the PDSCH, and the downlink reference signal. The demultiplexing unit 1055 outputs the downlink reference signal resulting from the demultiplexing, to the channel measurement unit 1059.

The demodulation unit 1053 demodulates the PDCCH and the PDSCH in compliance with a modulation scheme such as QPSK, 16 Quadrature Amplitude Modulation (16 QAM), or 64 QAM, and outputs a result of the demodulation to the decoding unit 1051.

The decoding unit 1051 decodes the downlink data and outputs the decoded downlink data to the higher layer processing unit 101. The channel measurement unit 1059 calculates a downlink channel estimate from the downlink reference signal and outputs the calculated downlink channel estimate to the demultiplexing unit 1055. The channel measurement unit 1059 calculates the channel state information and outputs the channel state information to the higher layer processing unit 101.

The transmission unit 107 generates the uplink reference signal in accordance with the control signal input from the control unit 103, codes and modulates the uplink data or uplink control information input from the higher layer processing unit 101, multiplexes the PUCCH, the PUSCH, and the generated uplink reference signal, and transmits a result of the multiplexing to the base station apparatus 3 through the transmit and receive antenna 109.

The coding unit 1071 codes the uplink control information and uplink data input from the higher layer processing unit 101, and outputs coding bits to the PUSCH generation unit and/or the PUCCH generation unit.

Figure 8:
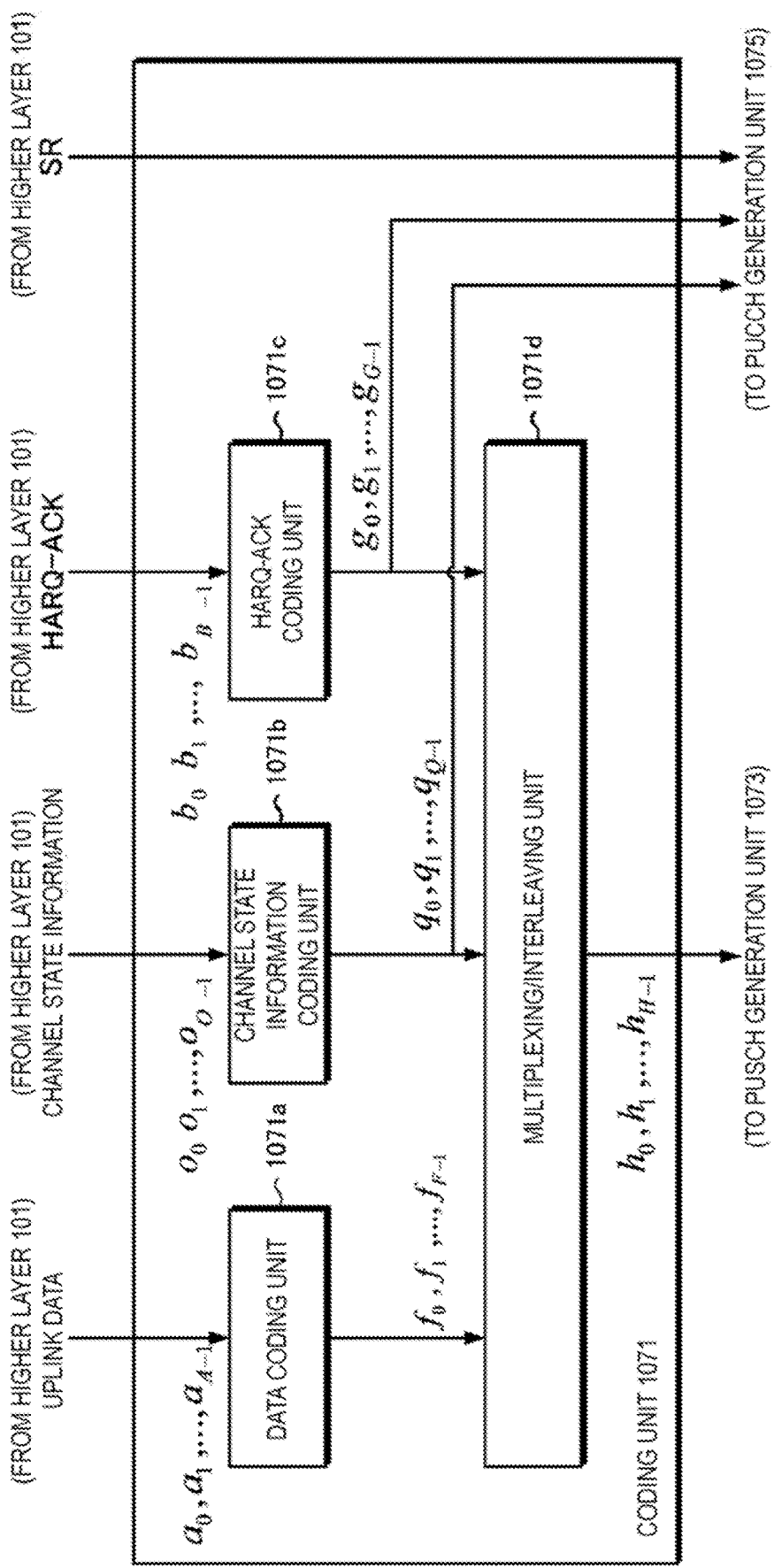
FIG. 8 is a schematic block diagram illustrating a configuration of a coding unit 1071 according to the present invention.

FIG. 8 is a schematic block diagram illustrating a configuration of the coding unit 1071 according to the present invention. The coding unit 1071 includes a data coding unit 1071a, a channel state information coding unit 1071b, a HARQ-ACK coding unit 1071c, and a multiplexing/interleaving unit 1071d.

The data coding unit 1071a adds CRC parity bits generated from the uplink data to uplink data $a_i$ input from the higher layer 101, applies error correction coding to the uplink data to which the CRC parity bits are added, and outputs coding bits $f_i$ of the uplink data to the multiplexing/interleaving unit 1071d. An index A represents a payload size (the number of bits) of the uplink data. An index F represents the number of coding bits of the uplink data.

The channel state information coding unit 1071b codes channel state information $o_i$. In a case that the channel state information is transmitted by using the PUSCH, the channel state information coding unit 1071b outputs coding bits $q_i$ of the channel state information to the multiplexing/interleaving unit 1071d. In a case that the channel state information is transmitted by using the PUCCH, the channel state information coding unit 1071b outputs the coding bits $q_i$ of the channel state information to the PUCCH generation unit 1075. An index O represents the number of bits of the channel state information. An index Q represents the number of coding bits of the channel state information.

The HARQ-ACK coding unit 1071c codes a HARQ-ACK $b_i$. In a case that the HARQ-ACK is transmitted by using the PUSCH, the HARQ-ACK coding unit 1071c outputs coding bits $g_i$ of the HARQ-ACK to the multiplexing/interleaving unit 1071d. In a case that the HARQ-ACK is transmitted by using the PUCCH, the HARQ-ACK coding unit 1071c outputs the coding bits $g_i$ of the HARQ-ACK to the PUCCH generation unit 1075. An index B represents the number of bits of the HARQ-ACK. An index G represents the number of coding bits of the HARQ-ACK.

The coding unit 1071 outputs the SR to the PUCCH generation unit 1075.

The multiplexing/interleaving unit 1071d multiplexes and interleaves the coding bits $f_i$ of the uplink data, the coding bits $q_i$ of the channel state information, and/or the coding bits $g_i$ of the HARQ-ACK, and outputs coupled coding bits $h_i$ to the PUSCH generation unit 1073.

Figure 9:
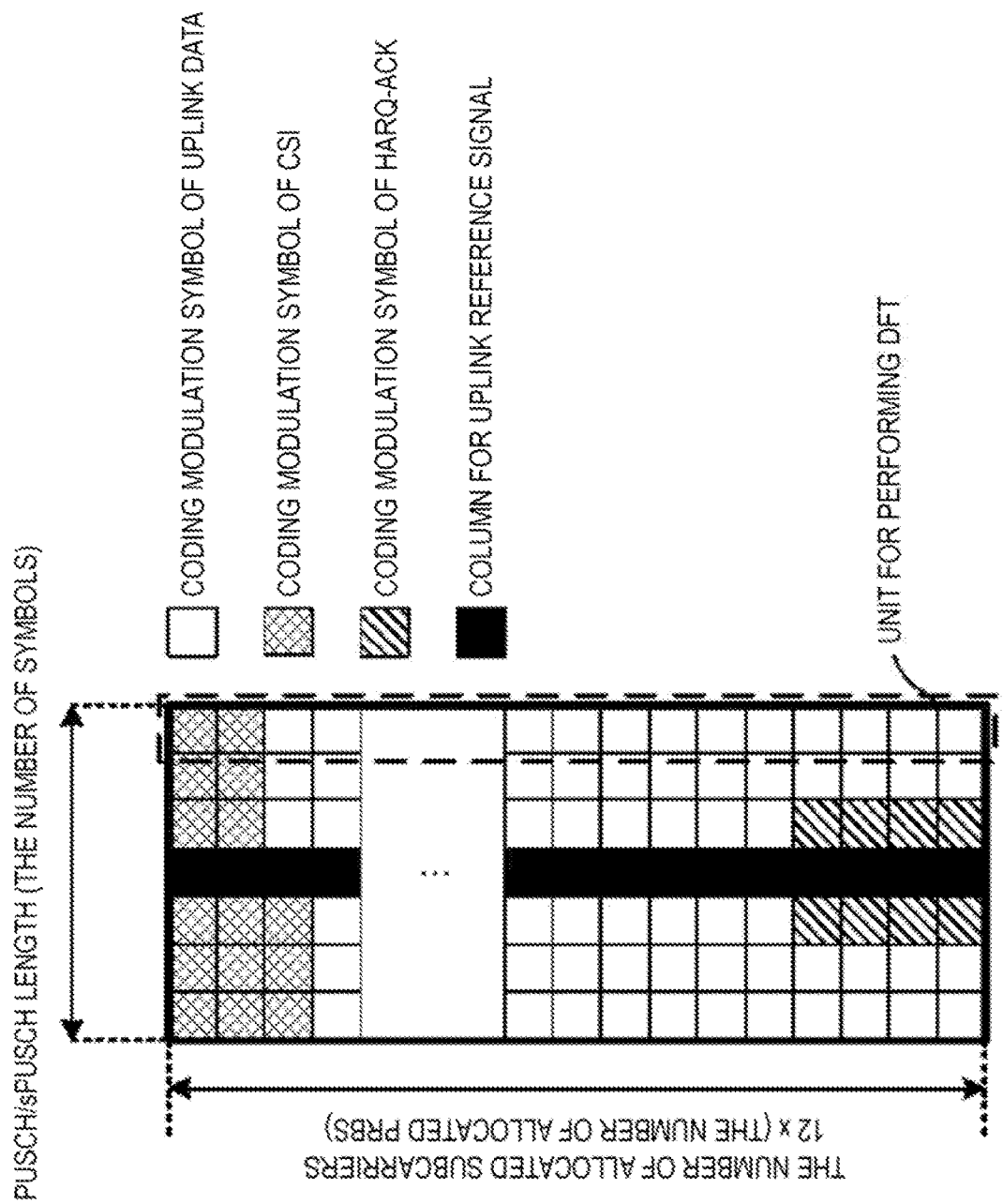
FIG. 9 is a diagram illustrating an example of a method of interleaving a coding modulation symbol according to the present embodiment.

FIG. 9 is a diagram illustrating an example of a method of interleaving a coding modulation symbol according to the present embodiment. The coding modulation symbol is a group of coding bits. One coding symbol is modulated to generate one modulation symbol. One coding modulation symbol includes the coding bits the number of which is the same as a modulation order $Q_m$ of the modulation scheme for the uplink data.

FIG. 9 illustrates columns the number of which is the same as the number of SC-FDMA symbols to which the PUSCH/sPUSCH is mapped. However, the fourth SC-FDMA symbol is used to transmit the uplink reference signal, and therefore, the coding modulation symbol is not mapped to the fourth column. FIG. 9 illustrates rows the number of which is the same as the number of subcarriers for the PUSCH/sPUSCH of which allocation is indicated by the uplink grant.

In the PUSCH signal generation unit 1073, multiple modulation symbols corresponding to the coding modulation symbols mapped to the same column in FIG. 9 are together subjected to discrete Fourier transform (Transform Precoding), and the signal subjected to DFT is mapped to the resource elements for the PUSCH/sPUSCH of which radio resource allocation is indicated by the uplink grant. The signal which is generated from the coding symbols on the i-th column and subjected to DFT is mapped to the resource elements corresponding to the i-th SC-FDMA symbol.

The PUSCH generation unit 1073 modulates the coding bits $h_i$ input from the coding unit 1071 to generate the modulation symbols, and performs DFT on the generated modulation symbols to generate the PUSCH/sPUSCH signal, and outputs the PUSCH/sPUSCH signal subjected to DFT to the multiplexing unit 1077.

The PUCCH generation unit 1075 generates the PUCCH/sPUCCH signal, based on the coding bits $q_i/g_i$ and/or SR input from the coding unit 1071, and outputs the generated PUCCH/sPUCCH signal to the multiplexing unit 1077.

The uplink reference signal generation unit 10711 generates the uplink reference signal, and outputs the generated uplink reference signal to the multiplexing unit 1077.

The multiplexing unit 1075 multiplexes, in accordance with the control signal input from the control unit 103, the signal input from the PUSCH generation unit 1073 and/or the signal input from the PUCCH generation unit 1075 and/or the uplink reference signal input from the uplink reference signal generation unit 10711 on the uplink resource elements for each transmit antenna port.

The radio transmitting unit 1077 performs Inverse Fast Fourier Transform (IFFT) on the signal resulting from the multiplexing, performs modulation in compliance with the SC-FDMA scheme, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

Hereinafter, a description is given of an apparatus configuration of the base station apparatus 3 according to the present invention.

Figure 10:
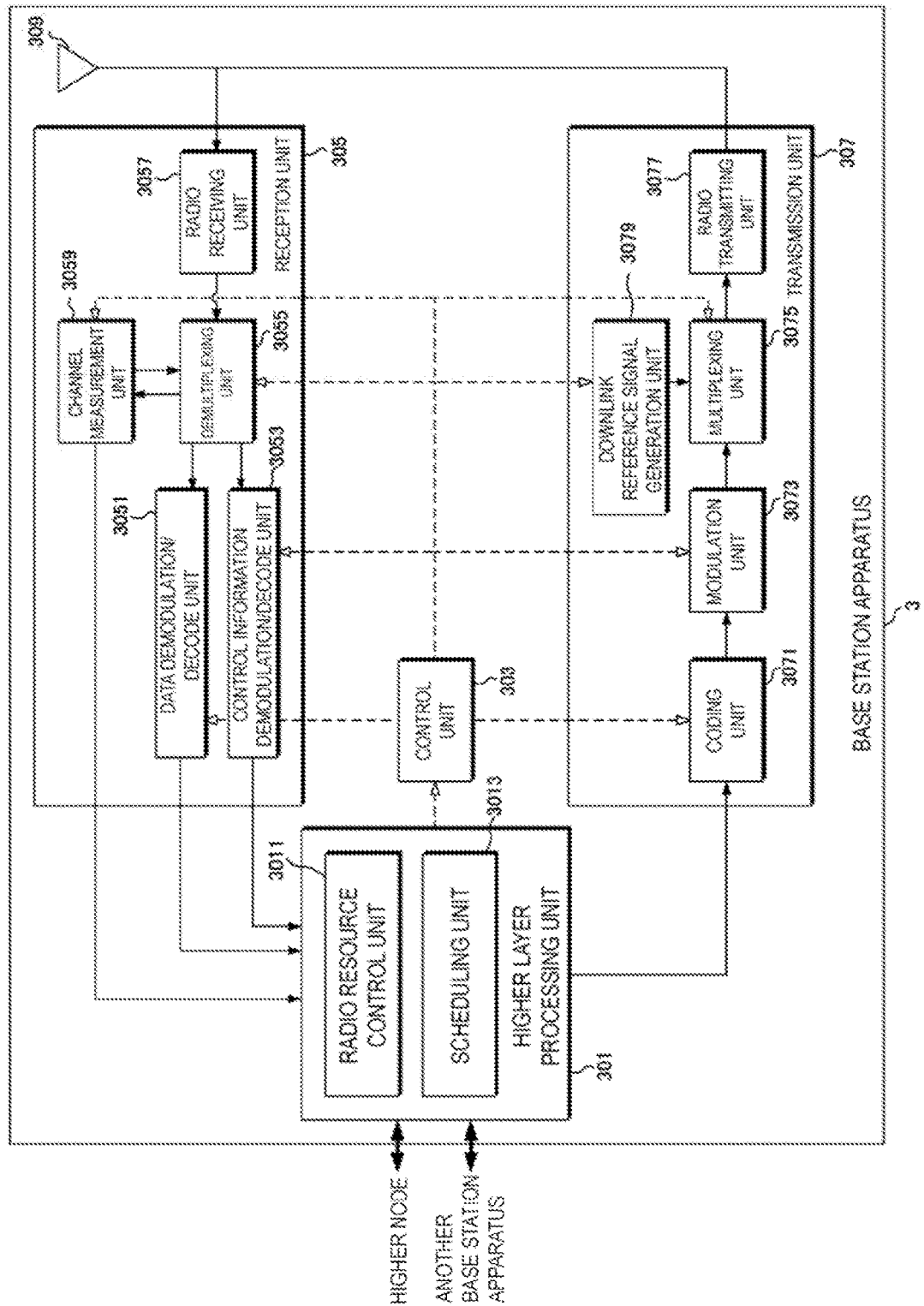
FIG. 10 is a schematic block diagram illustrating a configuration of a base station apparatus 3 according to the present invention.

FIG. 10 is a schematic block diagram illustrating a configuration of the base station apparatus 3 according to the present invention. As illustrated in FIG. 10, the base station apparatus 3 is configured to include a higher layer processing unit 301, a control unit 303, a reception unit 305, a transmission unit 307, and a transmit and receive antenna 309. The higher layer processing unit 301 is configured to include a radio resource control unit 3011 and a scheduling unit 3013. The reception unit 305 is configured to include a data demodulation/decode unit 3051, a control information demodulation/decode unit 3053, a demultiplexing unit 3055, a radio receiving unit 3057, and a channel measurement unit 3059. The transmission unit 307 is configured to include a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data mapped to the downlink PDSCH, an RRC signal, and a MAC Control Element (CE), and outputs a result of the generation or the acquirement to the HARQ control unit 3013. Furthermore, the radio resource control unit 3011 manages various pieces of configuration information for each of the mobile station devices 1. For example, the radio resource control unit 3011 performs management or the like of the serving cell configured for the mobile station device 1.

The scheduling unit 3013 included in the higher layer processing unit 301 manages the radio resource for the PUSCH or PUCCH allocated to the mobile station device 1. In a case that the mobile station device 1 is allocated with the PUSCH radio resource, the scheduling unit 3013 generates an uplink grant indicating allocation of the PUSCH radio resource, and outputs the generated uplink grant to the transmission unit 307.

Based on the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the mobile station device 1 through the transmit and receive antenna 309, and outputs information resulting from the decoding to the higher layer processing unit 301.

The radio receiving unit 3057 orthogonally demodulates an uplink signal received through the transmit and receive antenna 309, and converts the orthogonally demodulated analog signal into a digital signal. The radio receiving unit 3057 performs Fast Fourier Transform (FFT) on the digital signal, extracts a signal in the frequency domain, and outputs the resulting signal to the demultiplexing unit 3055.

The demultiplexing unit 1055 demultiplexes the signal input from the radio receiving unit 3057 into signals such as the PUCCH signal, the PUSCH signal, and the uplink reference signal. Moreover, the demultiplexing is performed based on the radio resource allocation information that is determined in advance by the base station apparatus 3 using the radio resource control unit 3011 and that is included in the uplink grant notified to each of the mobile station devices 1. The demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demultiplexing unit 3055 acquires a modulation symbol of the uplink data and a modulation symbol of the uplink control information (HARQ-ACK) from the demodulated PUCCH signal and PUSCH signal. The demultiplexing unit 3055 outputs the modulation symbol of the uplink data acquired from the PUSCH signal to the data demodulation/decode unit 3051. The demultiplexing unit 3055 outputs the modulation symbol of the uplink control information (HARQ-ACK) acquired from the PUCCH signal or PUSCH signal to the control information demodulation/decode unit 3053.

The channel measurement unit 3059 measures the channel estimate, the channel quality, and the like, based on the uplink reference signal input from the demultiplexing unit 3055, and outputs a result of the measurement to the demultiplexing unit 3055 and the higher layer processing unit 301.

The data demodulation/decode unit 3051 decodes the uplink data from the modulation symbol of the uplink data input from the demultiplexing unit 3055. The data demodulation/decode unit 3051 outputs the decoded uplink data to the higher layer processing unit 301.

The control information demodulation/decode unit 3053 decodes the HARQ-ACK from the modulation symbol of the HARQ-ACK input from the demultiplexing unit 3055. The control information demodulation/decode unit 3053 outputs the decoded HARQ-ACK to the higher layer processing unit 301.

The transmission unit 307 generates the downlink reference signal in accordance with the control signal input from the control unit 303, codes and modulates the downlink control information and the downlink data that are input from the higher layer processing unit 301, multiplexes the PDCCH, the PUSCH, and the downlink reference signal, and transmits a resultant signal of the multiplexing to the mobile station device 1 through the transmit and receive antenna 309.

The coding unit 3071 codes the downlink control information and downlink data input from the higher layer processing unit 301. The modulation unit 3073 modulates the coding bits input from the coding unit 3071, in compliance with the modulation scheme such as BPSK, QPSK, 16 QAM, or 64 QAM.

The downlink reference signal generation unit 3079 generates a downlink reference signal. The multiplexing unit 3075 multiplexes the modulation symbol of each channel and the downlink reference signal.

The radio transmitting unit 3077 performs inverse Fast Fourier Transform (IFFT) on the modulation symbol resulting from the multiplexing or the like, performs modulation in compliance with the OFDM scheme, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 309 for transmission.

Each of the units included in the terminal apparatus 1 and base station apparatus 3 may be constituted as a circuit.

Figure 11:
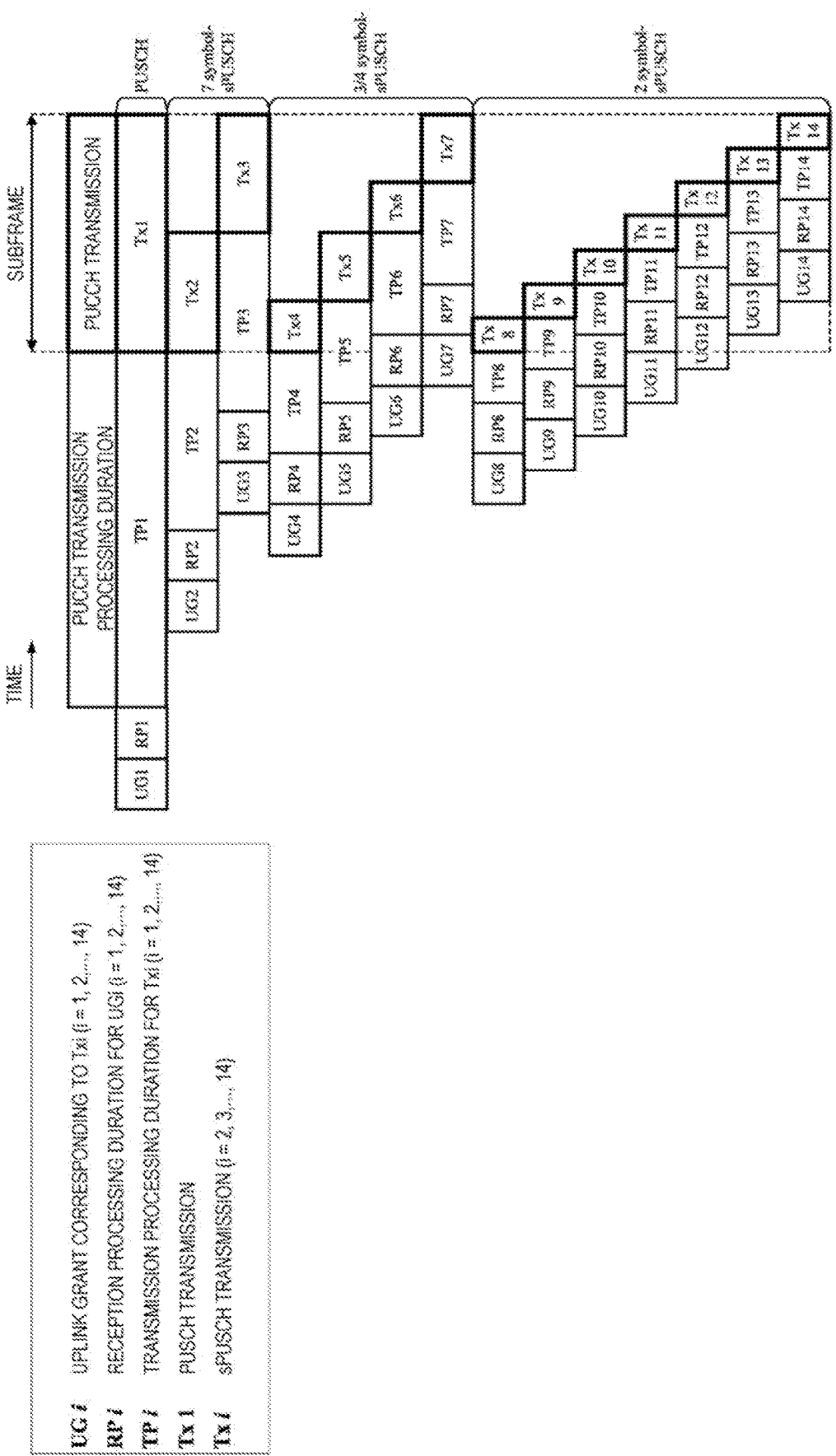
FIG. 11 is a diagram illustrating an example of a processing duration for a PUCCH/PUSCH/sPUSCH in the present embodiment.

FIG. 11 is a diagram illustrating an example of a processing duration for the PUCCH/PUSCH/sPUSCH in the present embodiment. In FIG. 11, the horizontal axis represents a time. Tx1 represents a PUSCH transmission. Tx2 to Tx14 represent sPUSCH transmissions. The Tx1 to the Tx14 correspond to one subframe.

A PUCCH transmission processing duration is a time period while the transmission processing for the PUCCH transmission is performed. UGi represents the PDCCH/sPDCCH including the uplink grant used for scheduling of the Txi. RPi represents a time period while reception processing for the UGi is performed. The terminal apparatus 1, in the RPi, decodes the PDCCH/sPDCCH including the uplink grant and performs a Cyclic Redundancy Check (CRC). The terminal apparatus 1 considers, based on a success in the CRC, that the PDCCH/sPDCCH destined to the apparatus itself is successfully detected. Respective timings when the terminal apparatus 1 considers that the UG1 to the UG14 are successfully detected may be different from each other.

TPi represents a time period while the transmission processing for the Txi is performed based on the received uplink grant. A length of the TN may be associated with a length of the corresponding Txi. The shorter the corresponding Txi length, the shorter the TPi length may be.

The transmission processing in the present embodiment may include (i) coding processing, (ii) modulation symbol generation processing, (iii) discrete Fourier transform (Transform Precoding) processing, (iv) resource element multiplex processing, (v) baseband signal generation processing, and the like.

The PUCCH transmission may be transmission of the uplink control information using the PUCCH (periodic channel state information report and/or HARQ-ACK). The sPUCCH transmission may be transmission of the uplink control information using the sPUCCH (periodic channel state information report and/or HARQ-ACK). The PUSCH transmission may be transmission of a transport block using the PUSCH. The sPUSCH transmission may be transmission of the transport block using the sPUSCH.

In a case that one or multiple transmissions of the uplink control information using the PUCCH, one or multiple transmissions of the uplink control information using the sPUCCH, one or multiple transmissions using the PUSCH, and/or one or multiple transmissions using the sPUSCH occur in the "identical SC-TDMA symbol" in one serving cell (one carrier), some of the transmissions may be dropped based at least on some or all of an item B to an item L described later.

In a case that one or multiple transmissions of the uplink control information using the PUCCH, one or multiple transmissions of the uplink control information using the sPUCCH, one or multiple transmissions using the PUSCH, and/or one or multiple transmissions using the sPUSCH occur in the "identical subframe" in one serving cell (one carrier), some of the transmissions may be dropped, based at least on some or all of the item B to the item L described later.

The terminal apparatus 1 may drop some of the transmissions, based on a difference between two values for two transmissions in the identical item.

Item A: a cell index of the serving cell in which the transmission is performed (ServCellIndex)
Item B: a transmission bandwidth
Item C: a transmission length (the number of SC-FDMA symbols)
Item D: a starting SC-FDMA symbol of the transmission
Item F: an ending SC-FDMA symbol of the transmission
item F: a transmission subcarrier spacing
item G: a value of a field included in the uplink grant corresponding to the PUSCH/sPUSCH transmission
Item H: a size of the transmitted uplink data (the number of bits)
Item I: a coding rate of the transmitted uplink data
Item J: the number of bits of the transmitted uplink control information
Item K: a coding rate of the transmitted uplink control information
Item L: a type of the transmitted uplink control information (HARQ-ACK, CSI, SR)

The transmission in each of the item A to the item F may include some or all of the PUCCH transmission, the sPUCCH transmission, the PUSCH transmission, the sPUSCH transmission, and the PDCCH/EPDCCH/sPDCCH transmission. The transmission in each of the item A to the item F may include transmission on a different channel. The transmission in each of the item A to the item F may include transmission on the same channel. Here, the PDCCH/EPDCCH/sPDCCH transmission includes the uplink grant corresponding to the PUSCH/sPUSCH transmission.

The cell index is used to identify the serving cell. The cell index of the primary cell is '0'. The cell index of the secondary cell(s) is an integer larger than '0'. The cell index of the secondary cell(s) may be indicated by information/parameter transmitted by the base station apparatus 3.

In the case that one or multiple transmissions of the uplink control information using the PUCCH, one or multiple transmissions of the uplink control information using the sPUCCH, one or multiple transmissions using the PUSCH, and/or one or multiple transmissions using the sPUSCH occur in the "identical SC-FDMA symbol" in one serving cell (one carrier), a channel used for transmitting of the uplink control information may be selected, based at least on some or all of the item B to the item L described above. Here, transmission other than the channel transmission including the uplink control information may not be dropped.

In the case that one or multiple transmissions of the uplink control information using the PUCCH, one or multiple transmissions of the uplink control information using the sPUCCH, one or multiple transmissions using the PUSCH, and/or one or multiple transmissions using the sPUSCH occur in the "identical SC-FDMA symbol" in one serving cell (one carrier), a channel used for transmitting of the uplink control information may be selected, based at least on some or all of the item B to the item L described above. Here, transmission other than the channel transmission including the uplink control information may not be dropped.

In a case that one or multiple transmissions of the uplink control information using the PUCCH, one or multiple transmissions of the uplink control information using the sPUCCH, one or multiple transmissions using the PUSCH, and/or one or multiple transmissions using the sPUSCH occur in the "identical SC-FDMA symbol" in multiple serving cells (multiple carriers), some of the transmissions may be dropped, based at least on some or all of the item A to the item L described above.

In a case that one or multiple transmissions of the uplink control information using the MATH, one or multiple transmissions of the uplink control information using the sPUCCH, one or multiple transmissions using the PUSCH, and/or one or multiple transmissions using the sPUSCH occur in the "identical subframe" in multiple serving cells (multiple carriers), some of the transmissions may be dropped, based at least on some or all of the item A to the item L described above.

In the case that one or multiple transmissions of the uplink control information using the PUCCH, one or multiple transmissions of the uplink control information using the sPUCCH, one or multiple transmissions using the PUSCH, and/or one or multiple transmissions using the sPUSCH occur in the "identical SC-FDMA symbol" in multiple serving cells (multiple carriers), the channel used for transmitting of the uplink control information may be selected, based at least on some or all of the item A to the item L described above. Here, transmission other than the channel transmission including the uplink control information may not be dropped.

In the case that one or multiple transmissions of the uplink control information using the PUCCH, one or multiple transmissions of the uplink control information using the sPUCCH, one or multiple transmissions using the PUSCH, and/or one or multiple transmissions using the sPUSCH occur in the "identical subframe" in multiple serving cells (multiple carriers), the channel used for transmitting of the uplink control information may be selected, based at least on some or all of the item A to the item L described above. Here, transmission other than the channel transmission including the uplink control information may not be dropped.

Hereinafter, an example of the channel drop/selection will be described using FIG. 12 to FIG. 16.

Figure 12:
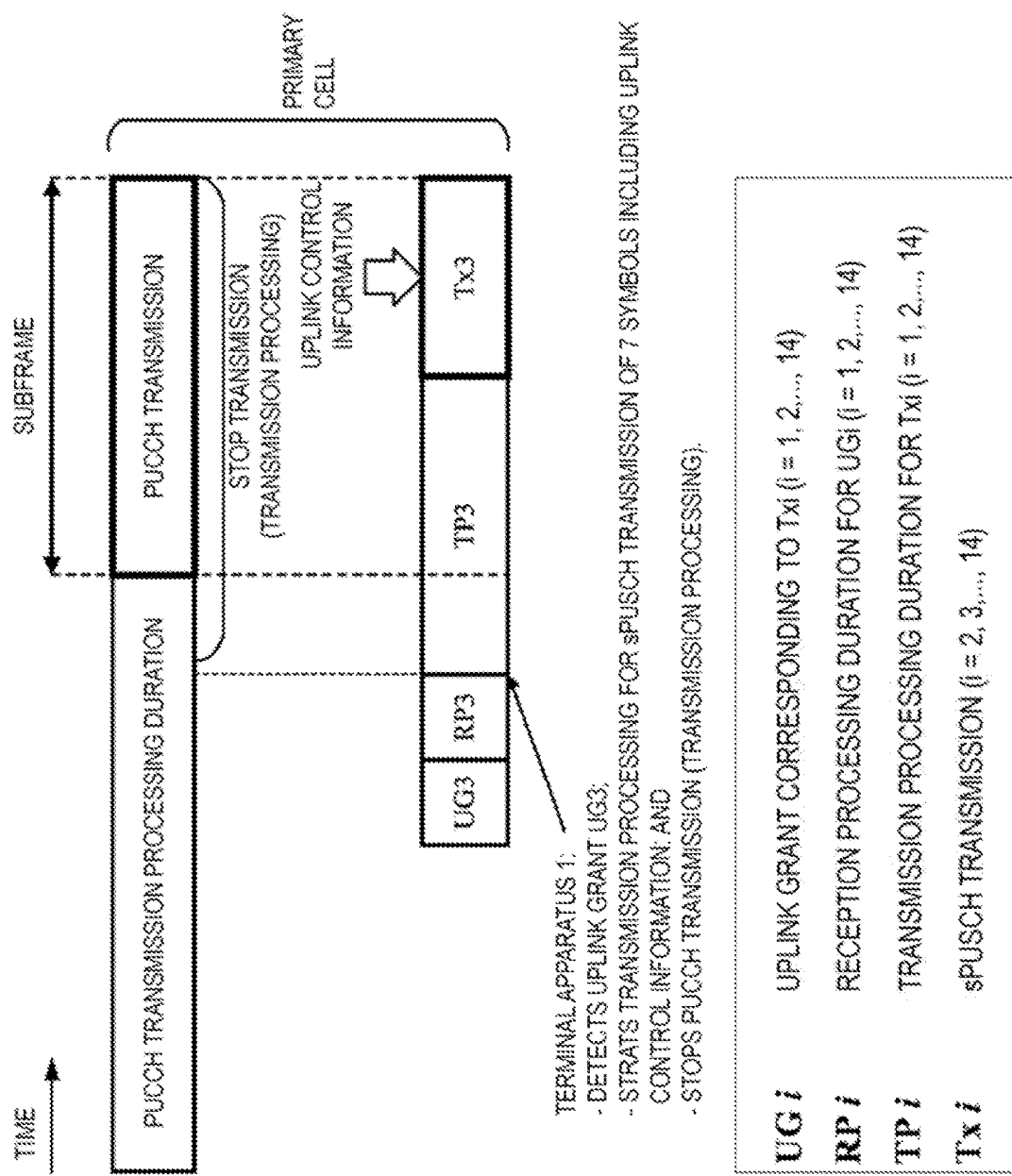
FIG. 12 is a diagram illustrating an example of channel drop/selection according to the present embodiment.

FIG. 12 is a diagram illustrating an example of the channel drop/selection according to the present embodiment. In FIG. 12, the PUCCH transmission and a 7-symbol sPUSCH transmission Tx3 occur in the identical subframe/the identical SC-FDMA symbol in the primary cell. The terminal apparatus 1 may stop the PUCCH transmission processing after detecting the PDCCH/EPDCCH/sPDCCH including an uplink grant UG3 corresponding to the 7-symbol sPUSCH transmission Tx3. The terminal apparatus 1 may transmit the uplink control information corresponding to the PUCCH transmission by using the 7-symbol sPUSCH transmission Tx3.

Figure 13:
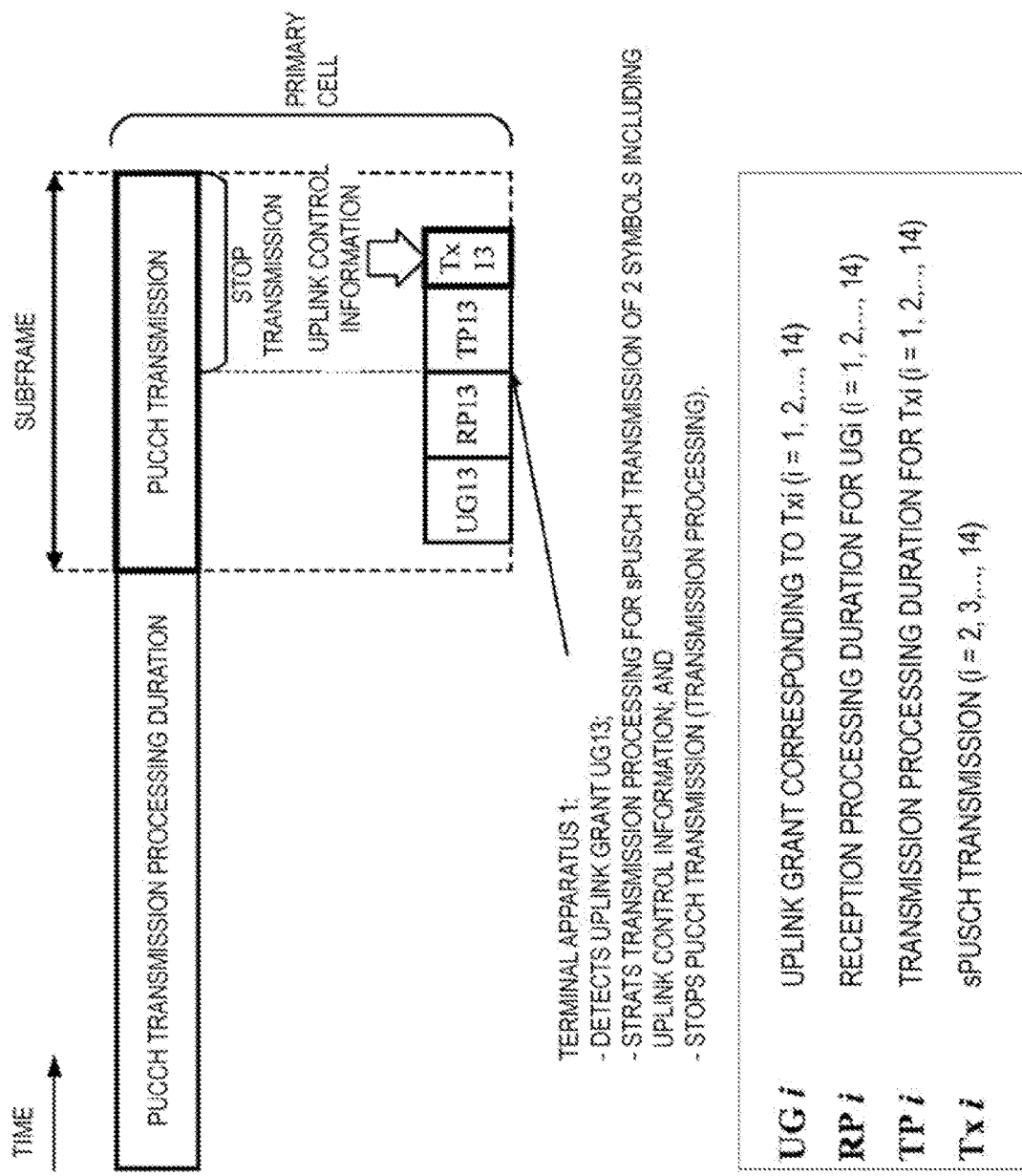
FIG. 13 is a diagram illustrating an example of channel drop/selection according to the present embodiment.

FIG. 13 is a diagram illustrating an example of the channel drop/selection according to the present embodiment. In FIG. 13, the PUCCH transmission and a 2-symbol sPUSCH transmission Tx13 occur in the subframe/SC-FDMA symbol in the primary cell. The terminal apparatus 1 may stop the PUCCH transmission even in a case that the PUCCH transmission has been started after detecting the PDCCH/EPDCCH/sPDCCH including an uplink grant UG13 corresponding to the 2-symbol sPUSCH transmission Tx13. The terminal apparatus 1 may transmit the uplink control information corresponding to the PUCCH transmission by using the 2-symbol sPUSCH transmission Tx13. The terminal apparatus 1 may store the uplink control information before coding until the PUCCH transmission completes even in a case that the PUCCH transmission processing is ended, in order to use the 2-symbol sPUSCH transmission Tx13 to transmit the uplink control information corresponding to the PUCCH transmission. Alternatively, the terminal apparatus 1 may not transmit the uplink control information corresponding to the PUCCH transmission by using the 2-symbol sPUSCH transmission Tx13.

Figure 14:
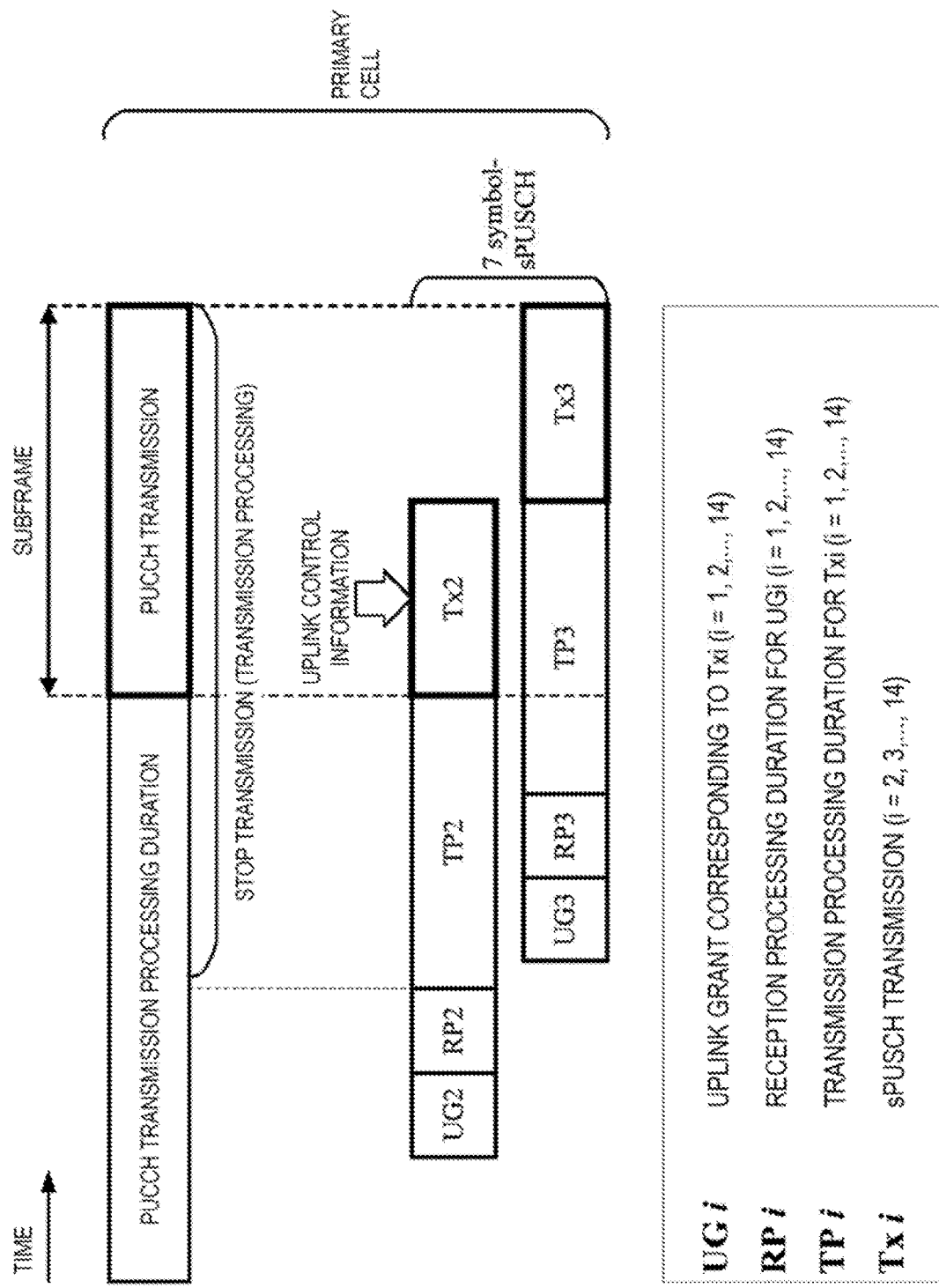
FIG. 14 is a diagram illustrating an example of channel drop/selection according to the present embodiment.

FIG. 14 is a diagram illustrating an example of the channel drop/selection according to the present embodiment. In FIG. 14, the PUCCH transmission and the 7-symbol sPUSCH transmissions Tx2 and Tx3 occur in the subframe/SC-FDMA symbol in the primary cell. Here, the 7-symbol sPUSCH transmissions Tx2 and Tx3 do not occur in the identical SC-FDMA symbol. The terminal apparatus 1 may stop the PUCCH transmission processing after detecting the PDCCH/EPDCCH/sPDCCH including an uplink grant UG2 corresponding to the 7-symbol sPUSCH transmission Tx2. The terminal apparatus 1 may transmit the uplink control information corresponding to the PUCCH transmission by using the 7-symbol sPUSCH transmission Tx2. The terminal apparatus 1 does not transmit the uplink control information corresponding to the PUCCH transmission by using the 7-symbol sPUSCH transmission Tx3 even in a case of detecting the PDCCH/EPDCCH/sPDCCH including the uplink grant UG3 corresponding to the 7-symbol sPUSCH transmission Tx3. In order for the terminal apparatus 1 to stop the transmission of the uplink control information using the 7-symbol sPUSCH transmission Tx2 after detecting the PDCCH/EPDCCH/sPDCCH including the uplink grant UG3 corresponding to the 7-symbol sPUSCH transmission Tx3, the transmission processing needs to be performed again from the processing of the multiplexing/interleaving unit 1071d. However, there is not enough time to perform the transmission processing of the 7-symbol sPUSCH transmission Tx2 after detecting the PDCCH/EPDCCH/sPDCCH including the uplink grant UG3 corresponding to the 7-symbol sPUSCH transmission Tx3.

In other words, the terminal apparatus 1 may select the sPUSCH transmission Tx2, based on that (i) a starting SC-FDMA symbol of the 7-symbol sPUSCH transmission Tx2 is before a starting SC-FDMA symbol of the 7-symbol sPUSCH transmission Tx3. (ii) an ending SC-FDMA symbol of the 7-symbol sPUSCH transmission Tx2 is before an ending SC-FDMA symbol of the 7-symbol sPUSCH transmission Tx3, (iii) a starting SC-FDMA symbol of the PDCCH/EPDCCH/sPDCCH transmission including the uplink grant UG2 corresponding to the 7-symbol sPUSCH transmission Tx2 is before a starting SC-FDMA symbol of the PDCCH/EPDCCH/sPDCCH transmission including the uplink grant UG3 corresponding to the 7-symbol sPUSCH transmission Tx3, and/or (iv) an ending SC-FDMA symbol of the PDCCH/EPDCCH/sPDCCH transmission including the uplink grant UG2 corresponding to the 7-symbol sPUSCH transmission Tx2 is before an ending SC-FDMA symbol of the PDCCH/EPDCCH/sPDCCH transmission including the uplink grant UG3 corresponding to the 7-symbol sPUSCH transmission Tx3. The terminal apparatus 1 may transmit the uplink control information (periodic channel state information report and/or HARQ-ACK) by using the selected sPUSCH transmission Tx2.

Figure 15:
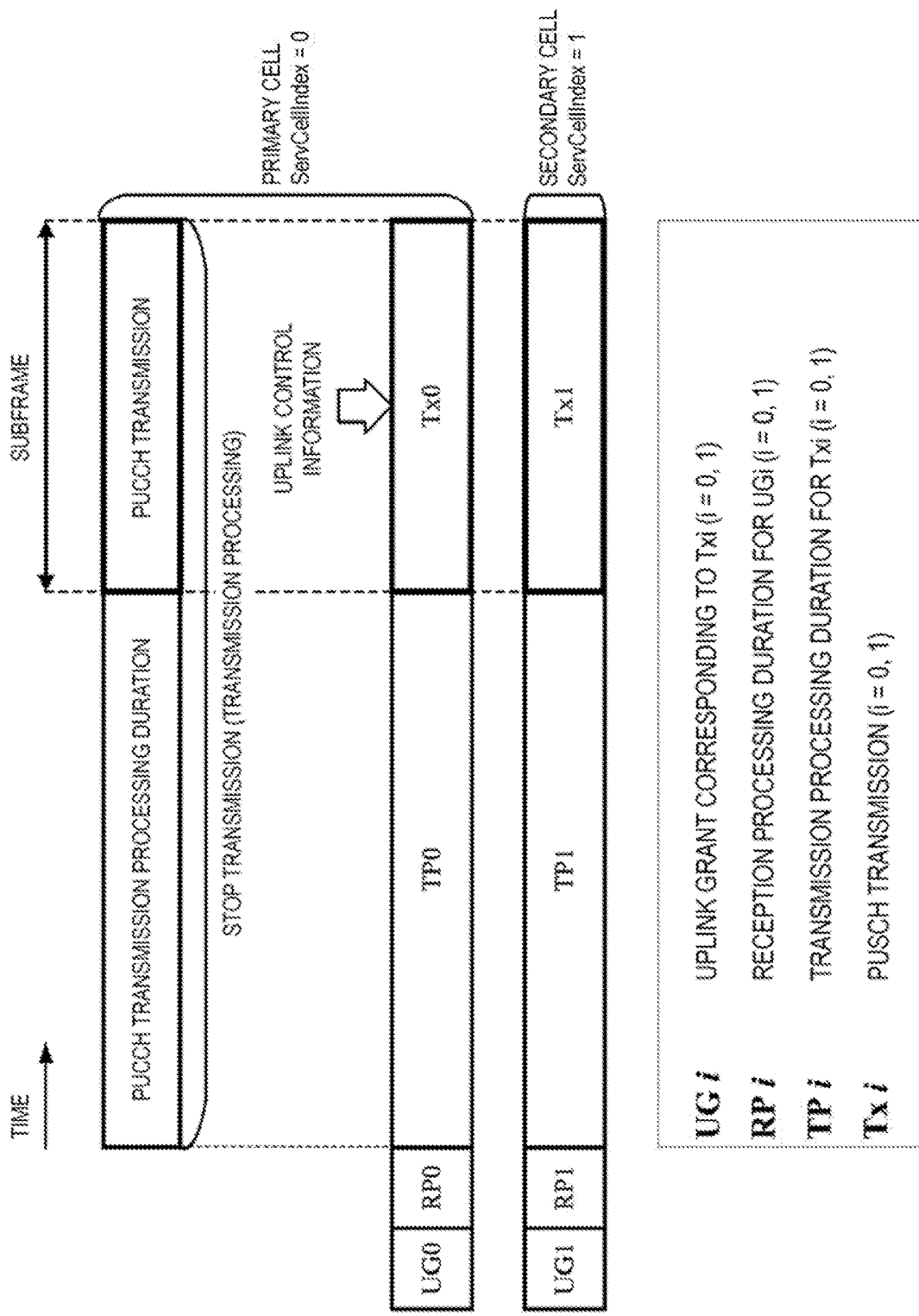
FIG. 15 is a diagram illustrating an example of channel drop/selection according to the present embodiment.

FIG. 15 is a diagram illustrating an example of the channel drop/selection according to the present embodiment. In FIG. 15, the PUCCH transmission in the primary cell, a PUSCH transmission Tx0 in the primary cell, and the PUSCH transmission Tx3 in the primary cell occur in the subframe/SC-FDMA symbol. In FIG. 15, the PUCCH transmission in the primary cell, the PUSCH transmission Tx0 in the primary cell, and the PUSCH transmission Tx3 in the primary cell are mapped to the SC-FDMA symbol of the same index. The terminal apparatus 1 may stop the PUCCH transmission processing after detecting the PDCCH/EPDCCH/sPDCCH including an uplink grant UG0 corresponding to the PUSCH transmission Tx0 and/or the PDCCH/EPDCCH/sPDCCH including the uplink grant UG1 corresponding to the PUSCH transmission Tx1. In a case that the uplink control information includes only the periodic channel state information report and/or the HARQ-ACK, the terminal apparatus 1 may select the PUSCH, based on the cell index. For example, the terminal apparatus 1 may select the PUSCH transmission Tx0 in the primary cell of which the cell index is the smallest. The terminal apparatus 1 may transmit the uplink control information (periodic channel state information report and/or HARQ-ACK) corresponding to the PUCCH transmission by using the selected PUSCH transmission Tx0.

To be more specific, the terminal apparatus 1 may select the PUSCH, based on the cell index in a case that multiple PUSCH transmissions occur in the subframe. The terminal apparatus 1 may transmit the uplink control information (periodic channel state information report and/or HARQ-ACK) by using the selected PUSCH transmission.

Figure 16:
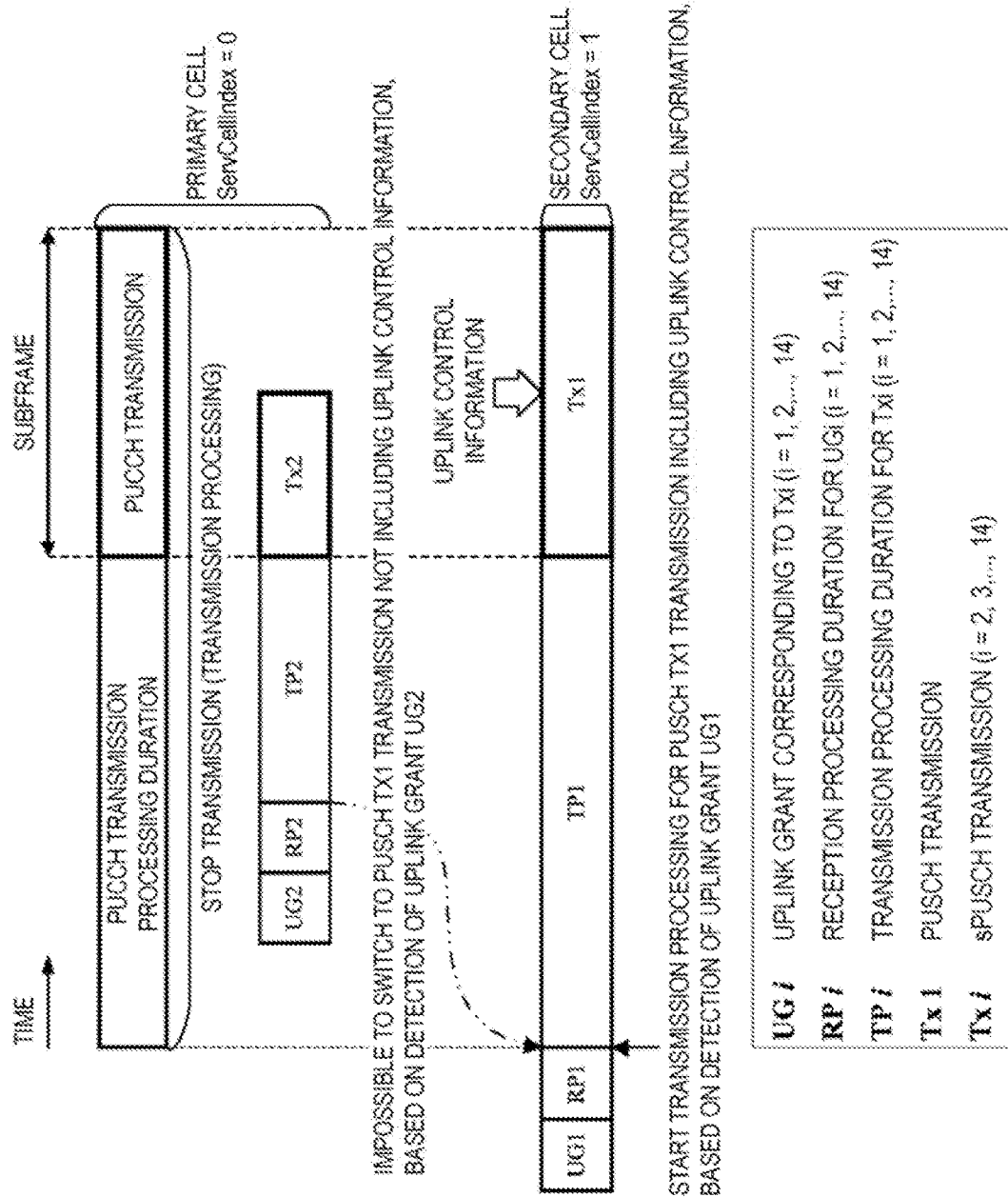
FIG. 16 is a diagram illustrating an example of channel drop/selection according to the present embodiment.

FIG. 16 is a diagram illustrating an example of the channel drop/selection according to the present embodiment. In FIG. 16, the PUCCH transmission in the primary cell, the 7-symbol sPUSCH transmission Tx2 in the primary cell, and the PUSCH transmission Tx1 in the secondary cell occur in the subframe/SC-FDMA symbol. In FIG. 16, the PUCCH transmission in the primary cell, the PUSCH transmission Tx0 in the primary cell, and the PUSCH transmission Tx3 in the primary cell are started from the SC-FDMA symbol of the same index. The terminal apparatus 1 may stop the PUCCH transmission processing after detecting the PDCCH/EPDCCH/sPDCCH including the uplink grant UG1 corresponding to the PUSCH transmission Tx1. The terminal apparatus 1 may transmit the uplink control information corresponding to the PUCCH transmission by using the PUSCH transmission Tx1. The terminal apparatus 1 does not transmit the uplink control information corresponding to the PUCCH transmission by using the 7-symbol sPUSCH transmission Tx2 even in a case of detecting the PDCCH/EPDCCH/sPDCCH including the uplink grant UG2 corresponding to the 7-symbol sPUSCH transmission Tx2. In order for the terminal apparatus 1 to stop the transmission of the uplink control information using the PUSCH transmission Tx1 after detecting the PDCCH/EPDCCH/sPDCCH including the uplink grant UG2 corresponding to the 7-symbol sPUSCH transmission Tx2, the transmission processing needs to be performed again from the processing of the multiplexing/interleaving unit 1071d. However, there is not enough time to perform the transmission processing of the PUSCH transmission Tx1 after detecting the PDCCH/EPDCCH/sPDCCH including the uplink grant UG2 corresponding to the 7-symbol sPUSCH transmission Tx2.

To be more specific, the terminal apparatus 1 may select the PUSCH regardless of the cell index in a case that the PUSCH transmission and the sPUSCH transmission occur in the subframe. The terminal apparatus 1 may transmit the uplink control information (periodic channel state information report and/or HARQ-ACK) by using the selected PUSCH transmission. In other words, the terminal apparatus 1 may select the channel, based on a length of the PUSCH transmission Tx1, a length of the 7-symbol sPUSCH transmission Tx2, the starting SC-FDMA symbol of the PUSCH transmission Tx1, and/or the starting SC-FDMA symbol of the 7-symbol sPUSCH transmission Tx2.

Here, in the examples in FIG. 12 to FIG. 16, in a case that the uplink control information is the SR, the terminal apparatus 1 may not transmit the uplink control information by using the X-symbol sPUSCH transmission or the PUSCH transmission.

Whether or not the periodic channel state information report is dropped in the subframe in which the aperiodic channel state information report is made may be determined based at least on some or all of the item A to the item L described above. Hereinafter, a description is given of an example of the aperiodic channel state information report in FIG. 12 to FIG. 16. The operations in FIG. 12 to FIG. 16 described above are not described in the following description for the purpose of simple description.

In FIG. 12, in a case that a value of a field included in the uplink grant UG3 is set in such a way as to trigger the aperiodic channel state information report, the periodic channel state information report may be dropped and the uplink control information including at least the aperiodic channel state information report may be transmitted by using the 7-symbol sPUSCH transmission Tx3.

In FIG. 13, in a case that a value of a field included in the uplink grant UG13 is set in such a way as to trigger the aperiodic channel state information report, the periodic channel state information report may be dropped and the uplink control information including at least the aperiodic channel state information report may be transmitted by using the 2-symbol sPUSCH transmission Tx13.

In FIG. 14, in a case that a value of a field included in the uplink grant UG2 is set in such a way as to trigger the aperiodic channel state information report, the periodic channel state information report may be dropped and the uplink control information including at least the aperiodic channel state information report may be transmitted by using the 7-symbol sPUSCH transmission Tx2.

In FIG. 14, in a case of field included in the uplink grant UG3 corresponding to the sPUSCH transmission Tx3 is set in such a way as to trigger the aperiodic channel state information report, the terminal apparatus 1 may select the sPUSCH transmission Tx3 and transmit the uplink control information including at least the aperiodic channel state information report by using the selected PUSCH transmission Tx3. Here, the periodic channel state information report is not dropped. To be more specific, the uplink control information (periodic channel state information report and/or HARQ-ACK) corresponding to the PUCCH transmission may be transmitted by using the 7-symbol sPUSCH transmission Tx2.

In FIG. 15, in a case that a value of a field included in the uplink grant UG0 is set in such a way as to trigger the aperiodic channel state information report, the periodic channel state information report may be dropped and the uplink control information including at least the aperiodic channel state information report may be transmitted by using the PUSCH transmission Tx0.

In FIG. 15, in a case that a value of field included in the uplink grant UG1 corresponding to the PUSCH transmission Tx1 is set in such a way as to trigger the aperiodic channel state information report, the terminal apparatus 1 may select the PUSCH transmission Tx1 and transmit the uplink control information (aperiodic channel state information report and/or HARQ-ACK) by using the selected PUSCH transmission Tx1. Here, the periodic channel state information report is dropped. To be more specific, the uplink control information (periodic channel state information report and/ or HARQ-ACK) corresponding to the PUCCH transmission is not transmitted by using the PUSCH transmission Tx0.

In FIG. 16, in a case that a value of a field included in the uplink grant UG1 is set in such a way as to trigger the aperiodic channel state information report, the periodic channel state information report may be dropped and the uplink control information including at least the aperiodic channel state information report may be transmitted by using the PUSCH transmission Tx1.

In FIG. 16, in a case that a value of field included in the uplink grant UG2 corresponding to the sPUSCH transmission Tx2 is set in such a way as to trigger the aperiodic channel state information report, the terminal apparatus 1 may select the sPUSCH transmission Tx2 and transmit the uplink control information including at least the aperiodic channel state information report by using the selected PUSCH transmission Tx2. Here, the periodic channel state information report is not dropped. To be more specific, the uplink control information (periodic channel state information report and/or HARQ-ACK) corresponding to the PUCCH transmission may be transmitted by using the 7-symbol sPUSCH transmission Tx1.

The terminal apparatus 1 according to the present embodiment is not configured with simultaneous transmission of the PUCCH and the PUSCH. In a case that the simultaneous transmission of the PUCCH and the PUSCH is configured, processing different from that in the present embodiment may be applied.

Various aspects of the terminal apparatus 1 and the base station apparatus 3 according to the present embodiment will be described below.

(1) A first aspect according to the present embodiment is the terminal apparatus 1 which includes the reception unit 105 configured to receive multiple uplink grants used for scheduling of multiple sPUSCHs in one subframe in one serving cell, and the transmission unit 107 configured to transmit the uplink control information by using one sPUSCH among the multiple sPUSCHs, the sPUSCH being transmitted first.

(2) In the first aspect according to the present embodiment, the uplink data not including the uplink control information is transmitted by using the multiple sPUSCHs except for the one sPUSCH being transmitted first.

(3) In the first aspect according to the present embodiment, the multiple sPUSCHs are not simultaneously transmitted.

(4) In the first aspect according to the present embodiment, the uplink control information includes the periodic channel state information report and/or the HARQ-ACK.

(5) A second aspect according to the present embodiment is the base station apparatus 3 which includes the transmission unit 307 configured to transmit multiple uplink grants used for scheduling of multiple sPUSCHs in one subframe in one serving cell, and the reception unit 305 configured to receive the uplink control information by using one sPUSCH among the multiple sPUSCHs, the sPUSCH being transmitted first.

(6) In the second aspect according to the present embodiment, the uplink data not including the uplink control information is received by using the multiple sPUSCHs except for the one sPUSCH being transmitted first.

(7) In the second aspect according to the present embodiment, the multiple sPUSCHs are not simultaneously received.

(8) In the second aspect according to the present embodiment, the uplink control information includes the periodic channel state information report and/or the HARQ-ACK.

(9) A third aspect according to the present embodiment is the terminal apparatus 1 which includes the reception unit 105 configured to receive the uplink grant used for scheduling of the PUSCH and the uplink grant used for scheduling of the sPUSCH, and the transmission unit 107 configured to transmit the uplink control information by using the PUSCH and/or the sPUSCH, wherein in a first case that the transmission unit 107 performs the sPUSCH transmission in a first subframe in the primary cell and performs the PUSCH transmission in the first subframe in the secondary cell, the transmission unit 107 transmits the uplink control information by using the PUSCH in the first subframe in the secondary cell.

(10) In the third aspect according to the present embodiment, in a second case that the transmission unit 107 performs the PUSCH transmission in a second subframe in the primary cell and performs the PUSCH transmission in the second subframe in the secondary cell, the transmission unit 107 transmits the uplink control information by using the PUSCH in the second subframe in the primary cell.

(11) In the third aspect according to the present embodiment, a cell index of the primary cell is '0' and a cell index of the secondary cell is an integer larger than '0'.

(12) In the third aspect according to the present embodiment, the uplink control information includes the periodic channel state information report and/or the HARQ-ACK.

(13) In the third aspect according to the present embodiment, in a case that, in the first case, the aperiodic channel state information report is made by using the sPUSCH in the first subframe in the primary cell, the periodic channel state information report is not dropped, and in a case that, in the first case, the aperiodic channel state information report is made by using the PUSCH in the first subframe in the secondary cell, the periodic channel state information report is dropped.

(14) in the third aspect according to the present embodiment, in a case that, in the second case, the aperiodic channel state information report is made by using the PUSCH in the second subframe in the primary cell, the periodic channel state information report is dropped, and in a case that, in the second case, the aperiodic channel state information report is made by using the PUSCH in the second subframe in the secondary cell, the periodic channel state information report is dropped.

(15) A fourth aspect according to the present embodiment is the base station apparatus 3 which includes the transmission unit 307 configured to transmit the uplink grant used for scheduling of the PUSCH and the uplink grant used for scheduling of the sPUSCH, and the reception unit 305 configured to receive the uplink control information by using the PUSCH and/or the sPUSCH, wherein in a first case that the reception unit 305 performs a sPUSCH reception in a first subframe in the primary cell and performs a PUSCH reception in the first subframe in the secondary cell, the reception unit 305 receives the uplink control information by using the PUSCH in the first subframe in the secondary cell.

(16) In the fourth aspect according to the present embodiment, in a second case that the reception unit 305 performs the PUSCH reception in a second subframe in the primary cell and performs the PUSCH reception in the second subframe in the secondary cell, the reception unit 305 receives the uplink control information by using the PUSCH in the second subframe in the primary cell.

(17) In the fourth aspect according to the present embodiment, a cell index of the primary cell is '0' and a cell index of the secondary cell is an integer larger than '0'.

(18) In the fourth aspect according to the present embodiment, the uplink control information includes the periodic channel state information report and/or the HARQ-ACK.

(19) In the fourth aspect according to the present embodiment, in a case that, in the first case, the aperiodic channel state information report is made by using the sPUSCH in the first subframe in the primary cell, the periodic channel state information report is not dropped, and in a case that, in the first case, the aperiodic channel state information report is made by using the PUSCH in the first subframe in the secondary cell, the periodic channel state information report is dropped.

(20) In the fourth aspect according to the present embodiment, in a case that, in the second case, the aperiodic channel state information report is made by using the PUSCH in the second subframe in the primary cell, the periodic channel state information report is dropped, and in a case that, in the second case, the aperiodic channel state information report is made by using the PUSCH in the second subframe in the secondary cell, the periodic channel state information report is dropped.

(21) A fifth aspect according to the present embodiment is the terminal apparatus 1 which includes the reception unit 105 configured to receive multiple uplink grants used for scheduling of multiple sPUSCHs in one subframe in one serving cell and the transmission unit 107 configured to make the periodic channel state information report by using one sPUSCH among the multiple sPUSCHs in the one subframe, the one sPUSCH being transmitted first, wherein in a case that a value of a field in one uplink grant among the multiple uplink grants is set in such a way as to trigger the aperiodic channel state information report, the transmission unit 107 makes the aperiodic channel state information report by using the sPUSCH corresponding to the one uplink grant among the multiple sPUSCHs; in a case that the one sPUSCH corresponding to the one uplink grant is the one sPUSCH being transmitted first, the periodic channel state information report is dropped; and in a case that the one sPUSCH corresponding to the one uplink grant is not the one sPUSCH being transmitted first, the periodic channel state information report is not dropped.

(22) A sixth aspect according to the present embodiment is the base station apparatus 3 which includes the transmission unit 307 configured to transmit multiple uplink grants used for scheduling of multiple sPUSCHs in one subframe in one serving cell, and the reception unit 305 configured to receive the periodic channel state information report by using one sPUSCH among the multiple sPUSCHs in the one subframe, the one sPUSCH being received first, wherein in a case that a value of a field in one uplink grant among the multiple uplink grants is set in such a way as to trigger the aperiodic channel state information report, the reception unit 305 receives the aperiodic channel state information report by using the sPUSCH corresponding to the one uplink grant among the multiple sPUSCHs; in a case that the one sPUSCH corresponding to the one uplink grant is the one sPUSCH being received first, the periodic channel state information report is dropped; and in a case that the one sPUSCH corresponding to the one uplink grant is not the one sPUSCH being received first, the periodic channel state information report is not dropped.

According to the above, the terminal apparatus can efficiently transmit the uplink control information. In addition, the base station apparatus can efficiently receive the uplink control information.

A program running on each of the base station apparatus 3 and the terminal apparatus 1 according to the present invention may serve as a program that controls a Central Processing Unit (CPU) and the like (a program for causing a computer to operate) in such a manner as to enable the functionalities according to the above-described embodiments of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Moreover, the terminal apparatus 1 and the base station apparatus 3 according to the above-described embodiments may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station apparatus 3 according to the above-described embodiments may be achieved as an aggregation (a device group) constituted of multiple devices. Each of the devices constituting such a device group may include some or all portions of each function or each functional block of the base station apparatus 3 according to the above-described embodiments. The device group may include each general function or each functional block of the base station apparatus 3. Furthermore, the terminal apparatus 1 according to the above-described embodiments can also communicate with the base station apparatus as the aggregation.

Furthermore, the base station apparatus 3 according to the above-described embodiments may serve as an Evolved Universal Terrestrial Radio Access Network (EUTRAN). Furthermore, the base station apparatus 3 according to the above-described embodiments may have some or all portions of the functions of a node higher than an eNodeB.

Furthermore, some or all portions of each of the terminal apparatus 1 and the base station apparatus 3 according to the above-described embodiments may be achieved as an LSI which is a typical integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication device, but the present invention is not limited to such a terminal apparatus, and is applicable to a terminal apparatus or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

CROSS-REFERENCE OF RELATED APPLICATION

This application claims the benefit of priority to JP 2016-090465 filed on Apr. 28, 2016, which is incorporated herein by reference in its entirety.

REFERENCE SIGNS LIST 1 (1A, 1B, 1C) Terminal apparatus
3 Base station apparatus
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling unit
3011 Radio resource control unit
3013 Scheduling unit

The invention claimed is:

1. A terminal apparatus comprising:
a reception circuitry configured to receive a first DCI format and a second DCI format, the first DCI format being used for scheduling of a first uplink physical channel and the second DCI format being used for scheduling of a second uplink physical channel; and
a transmission circuitry configured to transmit HARQ-ACK (Hybrid Automatic Repeat request ACKnowledgement) response to be transmitted on a physical uplink control channel by using only the first uplink physical channel from the first and second uplink physical channels in a subframe in a serving cell in case that a transmission of the physical uplink control channel with HARQ-ACK response and transmissions of the first and second uplink physical channels would occur in the subframe in the serving cell, wherein starting symbol of the first uplink physical channel is before starting symbol of the second uplink physical channel, the subframe includes 14 symbols for normal cyclic prefix, and each of the first and second uplink physical channels are used to transmit an uplink shared channel.

2. A terminal apparatus according to claim 1:

ending symbol of the first uplink physical channel is before ending symbol of the second uplink physical channel.

3. A base station apparatus comprising:

a transmission circuitry configured to transmit a first DCI format and a second DCI format, the first DCI format being used for scheduling of a first uplink physical channel and the second DCI format being used for scheduling of a second uplink physical channel; and a reception circuitry configured to receive HARQ-ACK (Hybrid Automatic Repeat request ACKnowledgement) response to be transmitted on a physical uplink control channel by using only the first uplink physical channel from the first and second uplink physical channels in a subframe in a serving cell in case that a transmission of the physical uplink control channel with HARQ-ACK response and transmissions of the first and second uplink physical channels would occur in the subframe in the serving cell, wherein starting symbol of the first uplink physical channel is before starting symbol of the second uplink physical channel, the subframe includes 14 symbols for normal cyclic prefix, and each of the first and second uplink physical channels are used to transmit an uplink shared channel.

4. A communication method used for a terminal apparatus, the method comprising:

receiving a first DCI format and a second DCI format, the first DCI format being used for scheduling of a first uplink physical channel and the second DCI format being used for scheduling of a second uplink physical channel; and transmitting HARQ-ACK (Hybrid Automatic Repeat request ACKnowledgement) response to be transmitted on a physical uplink control channel by using only the first uplink physical channel from the first and second uplink physical channels in a subframe in a serving cell in case that a transmission of the physical uplink control channel with HARQ-ACK response and transmissions of the first and second uplink physical channels would occur in the subframe in the serving cell, wherein starting symbol of the first uplink physical channel is before starting symbol of the second uplink physical channel, the subframe includes 14 symbols for normal cyclic prefix, and each of the first and second uplink physical channels are used to transmit an uplink shared channel.

5. A communication method used for a base station apparatus, the method comprising:

transmitting a first DCI format and a second DCI format, the first DCI format being used for scheduling of a first uplink physical channel and the second DCI format being used for scheduling of a second uplink physical channel; and receiving HARQ-ACK (Hybrid Automatic Repeat request ACKnowledgement) response to be transmitted on a physical uplink control channel by using only the first uplink physical channel from the first and second uplink physical channels in a subframe in a serving cell in case that a transmission of the physical uplink control channel with HARQ-ACK response and transmissions of the first and second uplink physical channels would occur in the subframe in the serving cell, wherein starting symbol of the first uplink physical channel is before starting symbol of the second uplink physical channel, the subframe includes 14 symbols for normal cyclic prefix, and each of the first and second uplink physical channels are used to transmit an uplink shared channel.

6. A base station apparatus according to claim 3:

ending symbol of the first uplink physical channel is before ending symbol of the second uplink physical channel.

* * * * *